United States Patent
Miki

(10) Patent No.: US 9,781,111 B2
(45) Date of Patent: Oct. 3, 2017

(54) OPERATION APPARATUS, CONTENT PARENTAL LOCK SETTING METHOD, AND ELECTRONIC APPARATUS

(71) Applicant: Saturn Licensing LLC, New York, NY (US)

(72) Inventor: Nanami Miki, Tokyo (JP)

(73) Assignee: Saturn Licensing, LLC, New York, NY (US)

( * ) Notice: Subject to any disclaimer, the term of this patent is extended or adjusted under 35 U.S.C. 154(b) by 0 days.

(21) Appl. No.: 14/193,628

(22) Filed: Feb. 28, 2014

(65) Prior Publication Data
US 2014/0182000 A1 Jun. 26, 2014

Related U.S. Application Data

(63) Continuation of application No. 12/653,040, filed on Dec. 8, 2009, now abandoned.

(30) Foreign Application Priority Data

Dec. 18, 2008 (JP) .............................. P2008-321873

(51) Int. Cl.
*H04L 29/06* (2006.01)
*H04N 7/16* (2011.01)
(Continued)

(52) U.S. Cl.
CPC ............ *H04L 63/10* (2013.01); *H04N 7/163* (2013.01); *H04N 7/17318* (2013.01);
(Continued)

(58) Field of Classification Search
CPC ................ H04L 63/10; H04N 21/4126; H04N 21/42204; H04N 21/43615; H04N 21/835;
(Continued)

(56) References Cited

U.S. PATENT DOCUMENTS 5,751,287 A * 5/1998 Hahn et al. .................... 715/775
5,969,748 A * 10/1999 Casement et al. .............. 725/27
(Continued)

FOREIGN PATENT DOCUMENTS

CN 1613100 A 5/2005
JP 2008-236153 A 10/2008
(Continued)

OTHER PUBLICATIONS

European Search Report, EP 09179516, dated Mar. 24, 2010.
(Continued)

*Primary Examiner* — Sarah Su
(74) *Attorney, Agent, or Firm* — Lerner, David, Littenberg, Krumholz & Mentlik, LLP

(57) ABSTRACT

An operation apparatus includes a communication section to communicate with an electronic apparatus capable of communicating, through a first transmission medium, with an accumulation apparatus capable of accumulating contents, the communication section communicating with the electronic apparatus through a second transmission medium, a content selection section to select a content to which a parental lock is to be set from among the contents accumulated in the accumulation apparatus, a release key setting section to set a key for releasing the parental lock for the content selected, a storage section to associate identification information of the content selected with the key set by the release key setting section and stores the identification information and the key associated with each other, and a parental lock notification section to notify the accumulation apparatus in which the content is accumulated of the identification information of the content to which the parental lock is set.

8 Claims, 17 Drawing Sheets

(51) Int. Cl.

| | | |
|---|---|---|
| *H04N 7/173* | (2011.01) | |
| *H04N 21/41* | (2011.01) | |
| *H04N 21/422* | (2011.01) | |
| *H04N 21/436* | (2011.01) | |
| *H04N 21/4627* | (2011.01) | |
| *H04N 21/475* | (2011.01) | |
| *H04N 21/835* | (2011.01) | |

(52) U.S. Cl.
CPC ... *H04N 21/4126* (2013.01); *H04N 21/42204* (2013.01); *H04N 21/43615* (2013.01); *H04N 21/4627* (2013.01); *H04N 21/4753* (2013.01); *H04N 21/835* (2013.01)

(58) Field of Classification Search
CPC ........... H04N 21/4627; H04N 21/4753; H04N 7/163; H04N 7/17318
USPC .......... 726/30, 2, 7, 27, 28; 713/165; 705/51
See application file for complete search history.

(56) References Cited

U.S. PATENT DOCUMENTS

| | | | |
|---|---|---|---|
| 6,141,488 A * | 10/2000 | Knudson et al. | 386/292 |
| 6,922,843 B1 | 7/2005 | Herrington et al. | |
| 7,100,192 B1 * | 8/2006 | Igawa | H04L 29/06027 |
| | | | 709/217 |
| 7,266,701 B2 | 9/2007 | Hayes et al. | |
| 7,684,674 B2 * | 3/2010 | Hamada et al. | 386/248 |
| 7,689,920 B2 | 3/2010 | Robbin et al. | |
| 7,962,930 B2 * | 6/2011 | Kim | 725/28 |
| 8,079,044 B1 | 12/2011 | Craner | |
| 2002/0188944 A1 * | 12/2002 | Noble | 725/39 |
| 2003/0005453 A1 * | 1/2003 | Rodriguez et al. | 725/87 |
| 2004/0073927 A1 | 4/2004 | Knudson et al. | |
| 2004/0083486 A1 * | 4/2004 | Park | 725/30 |
| 2004/0154040 A1 | 8/2004 | Ellis | |
| 2004/0194138 A1 * | 9/2004 | Boylan et al. | 725/42 |
| 2005/0028191 A1 * | 2/2005 | Sullivan et al. | 725/28 |
| 2005/0091679 A1 * | 4/2005 | Tanaka | G06Q 30/0633 |
| | | | 725/8 |
| 2005/0235321 A1 * | 10/2005 | Ahmad-Taylor | 725/56 |
| 2005/0262132 A1 * | 11/2005 | Morita | G06F 21/6218 |
| 2006/0095585 A1 * | 5/2006 | Meijs | H04L 12/4633 |
| | | | 709/245 |
| 2006/0150120 A1 | 7/2006 | Dresti et al. | |
| 2006/0179048 A1 * | 8/2006 | Doumuki | H04L 12/2805 |
| 2006/0242318 A1 * | 10/2006 | Nettle | G06F 9/505 |
| | | | 709/238 |
| 2006/0248557 A1 | 11/2006 | Stark et al. | |
| 2006/0253874 A1 | 11/2006 | Stark et al. | |
| 2006/0267995 A1 * | 11/2006 | Radloff et al. | 345/530 |
| 2007/0033525 A1 * | 2/2007 | Nuno | G06F 17/2247 |
| | | | 715/705 |
| 2007/0136778 A1 | 6/2007 | Birger et al. | |
| 2008/0155663 A1 | 6/2008 | Knowlson et al. | |
| 2009/0077490 A1 * | 3/2009 | Hanada | G06F 3/0482 |
| | | | 715/810 |
| 2009/0094347 A1 * | 4/2009 | Ting | G06F 17/30902 |
| | | | 709/219 |
| 2010/0199359 A1 * | 8/2010 | Miki | H04N 7/163 |
| | | | 726/30 |
| 2010/0235428 A1 * | 9/2010 | Kikkawa | H04N 5/765 |
| | | | 709/203 |
| 2010/0281142 A1 * | 11/2010 | Stoyanov | H04N 21/23406 |
| | | | 709/221 |
| 2012/0131649 A1 * | 5/2012 | Kase | H04N 21/6334 |
| | | | 726/4 |
| 2014/0156702 A1 * | 6/2014 | Shyamsunder | G06F 17/30424 |
| | | | 707/769 |
| 2014/0351344 A1 * | 11/2014 | Wu | H04L 67/34 |
| | | | 709/204 |

FOREIGN PATENT DOCUMENTS

| | | |
|---|---|---|
| WO | 03044756 A1 | 5/2003 |
| WO | 2004064377 A2 | 7/2004 |
| WO | 2007067974 A2 | 6/2007 |
| WO | 2008027730 A1 | 3/2008 |

OTHER PUBLICATIONS

European Office Action for Application No. 09179516.1 dated Jun. 1, 2012.
European Office Action for Application No. 09179516.1 dated Jan. 10, 2013.
European Office Action for Application No. 09179516.1 dated Feb. 26, 2014.
Chinese Office Action for Application No. 200910262433.3 dated Feb. 2, 2012.
Chinese Office Action for Application No. 200910262433.3 dated Aug. 29, 2012.
Chinese Office Action for Application No. 200910262433.3 dated Mar. 12, 2013.

* cited by examiner 701  702
| Server 1 | Living Room 1 |

701  702
| Server 2 | Network HDD |

701  702
| Server 3 | Juke Box |

| Apparatus ID | Server name |
|---|---|
| Server 1 | Living Room 1 |
| Server 2 | Network HDD |
| Server 3 | Juke Box |

| Living Room 1 |
| Network HDD |
| Juke Box |

FIG.11

| Content ID | Program title | Parental lock |
|---|---|---|
| Program 1 | Drama A | Without parental lock |
| Program 2 | Movie B | Without parental lock |
| Program 3 | Program for infants C | Without parental lock |

FIG.12

| Apparatus ID | Content ID | Program title | Parental lock | Parental unlock code |
|---|---|---|---|---|
| Server 2 | Program 1 | Drama A | Without parental lock | |
| Server 2 | Program 2 | Movie B | Without parental lock | |
| Server 2 | Program 3 | Program for infants C | Without parental lock | |

FIG.13

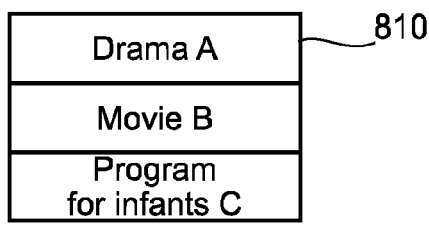

FIG.14

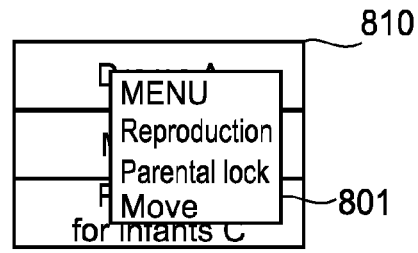
FIG.15
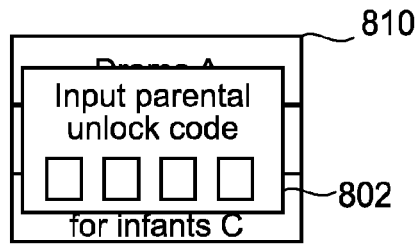
FIG.16
| 736 | 731 | 732 | 733 | 734 | 730 |
|---|---|---|---|---|---|
| Apparatus ID | Content ID | Program title | Parental lock | Parental unlock code | |
| Server 2 | Program 1 | Drama A | Without parental lock | | |
| Server 2 | Program 2 | Movie B | With parental lock | 1234 | ~735 |
| Server 2 | Program 3 | Program for infants C | Without parental lock | | |
FIG.17

| Content ID | Program title | Parental lock |
|---|---|---|
| Program 1 | Drama A | Without parental lock |
| Program 2 | Movie B | With parental lock |
| Program 3 | Program for infants C | Without parental lock |

| Content ID | Program title | Parental lock | Parental unlock code |
|---|---|---|---|
| Program 1 | Drama A | Without parental lock | |
| Program 2 | Movie B | With parental lock | |
| Program 3 | Program for infants C | Without parental lock | |

| Apparatus ID | Content ID | Program title | Parental lock | Parental unlock code |
|---|---|---|---|---|
| Server 2 | Program 1 | Drama A | Without parental lock | |
| Server 2 | Program 2 | Movie B | With parental lock | 1234 |
| Server 2 | Program 3 | Program for infants C | Without parental lock | |

| Apparatus ID | Content ID | Program title | Parental lock | Parental unlock code |
|---|---|---|---|---|
| Server 2 | Program 1 | Drama A | Without parental lock | |
| Server 1 | Program 2 | Movie B | With parental lock | 1234 |
| Server 2 | Program 3 | Program for infants C | Without parental lock | |

FIG.23

| 736 | 731 | 732 | 733 | 734 |
|---|---|---|---|---|
| Apparatus ID | Content ID | Program title | Parental lock | Parental unlock code |
| Server 2 | Program 1 | Drama A | Without parental lock | |
| Server 1 | Program 2 | Movie B | With parental lock | 1234 |
| Server 2 | Program 3 | Program for infants C | Without parental lock | |

| 736 | 731 | 732 | 733 | 734 |
|---|---|---|---|---|
| Apparatus ID | Content ID | Program title | Parental lock | Parental unlock code |
| Server 2 | Program 1 | Drama A | Without parental lock | |
| Server 1 | Program 2 | Movie B | Without parental lock | |
| Server 2 | Program 3 | Program for infants C | Without parental lock | |

FIG.24

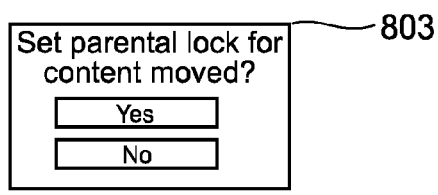

FIG.25

OPERATION APPARATUS, CONTENT PARENTAL LOCK SETTING METHOD, AND ELECTRONIC APPARATUS

CROSS-REFERENCE TO RELATED APPLICATION

The present application is a continuation of U.S. patent application Ser. No. 12/653,040, filed on Dec. 8, 2009, which claims priority from Japanese Patent Application No. JP 2008-321873 filed in the Japanese Patent Office on Dec. 18, 2008, the entire contents of which are incorporated herein by reference.

BACKGROUND OF THE INVENTION

1. Field of the Invention

The present invention relates to an operation apparatus capable of communicating, via a wireless medium, with an electronic apparatus capable of communicating, via a network, with an accumulation apparatus capable of accumulating contents, and to a content parental lock setting method by the operation apparatus. The present invention also relates to an electronic apparatus capable of communicating, via a network, with at least one accumulation apparatus capable of accumulating contents, and communicating with the operation apparatus via a wireless medium.

2. Description of the Related Art

In recent years, based on a DLNA (digital living network alliance), there has been structured a system that mutually connects, for example, digital AV (audiovisual) equipment or a PC (personal computer) with another in a home network environment as a local area network. With this structure, a content obtained through a broad band can be shared among family members and viewed in a home network environment, for example. That is, contents accumulated in various server apparatuses can be viewed by using various client apparatuses. As a result, for example, a situation in which a minor can easily view various contents beyond eyeshot of a parent or guardian may occur.

In view of this, there has been developed a technique in which a parental lock is set with respect to a content including an inappropriate image or audio that may give a bad influence to a minor (see, for example, Japanese Patent Application Laid-open No. 2008-236153 (paragraph 0026, FIG. 2) (hereinafter, referred to as Patent Document 1)). With the technique disclosed in Patent Document 1, restricted information for a content as a target of a parental lock setting is registered in a table for a parental lock, which is stored in a server apparatus. Upon reception of a content obtainment request from a client apparatus, the server apparatus judges whether restricted information is set for the content requested. When the restricted information is set for the content requested, the server apparatus does not transfer the content to the client apparatus.

SUMMARY OF THE INVENTION

With the technique disclosed in Patent document 1, a table for setting the parental lock for each server apparatus is created. Accordingly, in a case where there are a plurality of server apparatuses in a home network, it is necessary to set a parental lock with respect to a content for each server apparatus. This is a troublesome operation for a user. Further, for example, in a case where a minor has a PC in his/her own room, it may be substantially difficult for a parent or guardian to set a parental lock.

In view of the above-mentioned circumstances, it is desirable to provide an operation apparatus capable of communicating, via a wireless medium, with an electronic apparatus capable of communicating, via a network, with an accumulation apparatus capable of accumulating contents, and a parental lock setting method for contents by the operation apparatus. It is also desirable to provide an electronic apparatus capable of communicating, via a network, with at least one accumulation apparatus capable of accumulating contents and communicating, via a wireless medium, with the operation apparatus.

According to an embodiment of the present invention, there is provided an operation apparatus including a communication section, a content selection section, a release key setting section, a storage section, and a parental lock notification section. The communication section communicates with an electronic apparatus capable of communicating, through a first transmission medium, with an accumulation apparatus capable of accumulating contents, the communication section communicating with the electronic apparatus through a second transmission medium. The content selection section selects a content to which a parental lock is to be set from among the contents accumulated in the accumulation apparatus. The release key setting section sets a key for releasing the parental lock for the content selected. The storage section associates identification information of the content selected with the key set by the release key setting section and stores the identification information and the key associated with each other. The parental lock notification section notifies, through the electronic apparatus by using the communication section, the accumulation apparatus in which the content is accumulated of the identification information of the content to which the parental lock is set.

According to the embodiment of the present invention, the storage section of the operation apparatus associates the identification information of the content with the key for releasing the parental lock for the content and stores the identification information and the key associated with each other. As a result, it becomes possible for the operation apparatus to unify and manage the data related to the plurality of accumulation apparatuses.

In the embodiment, the operation apparatus further includes a name list obtainment section, an accumulation apparatus selection section, a content list obtainment section, and a list display section. The name list obtainment section requests to obtain a list of names of the accumulation apparatuses connected to the first transmission medium and obtains the list from the electronic apparatus by using the communication section. The accumulation apparatus selection section causes a user to select a name from the obtained list of the names of the accumulation apparatuses. The content list obtainment section requests the electronic apparatus by using the communication section to obtain a list of contents accumulated in the accumulation apparatus corresponding to the name selected and obtains the list of the contents. The list display section displays the obtained list of the contents to the user. The content selection section selects a content to which the parental lock is to be set from the displayed list of the contents.

According to the embodiment of the present invention, the user can obtain the list of the contents of each of the plurality of accumulation apparatuses connected to the network not from each of the plurality of accumulation apparatuses but from one operation apparatus.

In the embodiment, the parental lock notification section gives the electronic apparatus a notification including the identification information of the content and identification information of the accumulation apparatus that is a notification destination, to notify, through the electronic apparatus by using the communication section, the accumulation apparatus in which the content is accumulated of the identification information of the content to which the parental lock is set.

According to the embodiment of the present invention, it is possible to transmit the identification information of the content to any accumulation apparatus by using the one operation apparatus.

In the embodiment, the content list obtainment section transmits, to the electronic apparatus, a content list obtainment request including the identification information of the accumulation apparatus corresponding to the name selected, to request the electronic apparatus by using the communication section to obtain the list of the contents accumulated in the accumulation apparatus corresponding to the name selected and obtain the list of the contents.

According to the embodiment of the present invention, it is possible to obtain the list of the contents of any accumulation apparatus by using the one operation apparatus.

In the embodiment, the first transmission medium is a network, and the second transmission medium is a transmission medium independent of the network.

According to the embodiment of the present invention, the two-way communication is realized not between the operation apparatus and one accumulation apparatus but between the operation apparatus and the network.

In the embodiment, the operation apparatus further includes a parental lock release content selection section, a release key input section, and a parental lock release notification section. The parental lock release content selection section selects a content from which the parental lock is released. The release key input section causes the user to input a key for releasing the parental lock for the content selected. The parental lock release notification section notifies, when the key that is stored in the storage section with the key being associated with the content selected and the key that is input by the release key input section coincide, the accumulation apparatus in which the content is accumulated of a release of the parental lock for the content through the electronic apparatus by using the communication section.

According to the embodiment of the present invention, it is possible for the operation apparatus to unify and manage the release of the parental lock for the plurality of accumulation apparatuses.

In the embodiment, the operation apparatus further includes a backup processing section. The backup processing section transmits the identification information of the content and the key that are stored in the storage section with the identification information and the key being associated with each other to at least one of the accumulation apparatuses through the electronic apparatus by using the communication section and causes the accumulation apparatus to store, as a backup, the identification information and the key that are associated.

According to the embodiment of the present invention, even if the key for releasing the parental lock of the content which is stored in the operation apparatus is lost, the key is backed up by the accumulation apparatus, and therefore the safety is upgraded.

In the embodiment, the accumulation apparatus connected to the network includes a plurality of accumulation apparatuses. The operation apparatus further includes a move content selection section and a content move processing section. The move content selection section selects a content that is moved among the plurality of accumulation apparatuses. The content move processing section requests, when the key that is stored in the storage section with the key being associated with the content selected and the key that is input by the release key input section coincide, the plurality of accumulation apparatuses to cause the content to move, through the electronic apparatus by using the communication section.

According to the embodiment of the present invention, it is possible for the one operation apparatus to perform the move operation of the content from one accumulation apparatus to another accumulation apparatus.

In the embodiment, the operation apparatus further includes a parental lock resetting section. The parental lock resetting section sets whether the parental lock is set to the content accumulated in the accumulation apparatus to which the content is moved.

According to the embodiment of the present invention, it is possible for the one operation apparatus to perform the operation of setting whether the parental lock is set with respect to the content as the move destination.

According to another embodiment of the present invention, there is provided a content parental lock setting method of managing a parental lock with respect to contents by using an operation apparatus capable of communicating with at least one of electronic apparatuses capable of communicating with an accumulation apparatus capable of accumulating the contents through a first transmission medium, the operation apparatus capable of communicating with the at least one electronic apparatus through a second transmission medium. The content parental lock setting method includes selecting a content to which the parental lock is to be set from among the contents accumulated in the accumulation apparatus, setting a key for releasing the parental lock for the content selected, associating identification information of the content selected and the key set and storing the identification information and the key that are associated with each other, and notifying, through the electronic apparatus, the accumulation apparatus in which the content is accumulated of the identification information of the content to which the parental lock is set.

According to the embodiment of the present invention, the operation apparatus associates the identification information of the content and the key for releasing the parental lock for the content and stores the identification information and the key associated with each other. As a result, it is possible for the operation apparatus to unify and manage the information relating to the plurality of accumulation apparatuses.

According to another embodiment of the present invention, there is provided an electronic apparatus capable of communicating with one or more accumulation apparatuses capable of accumulating contents through a first transmission medium and capable of communicating with the operation apparatus through a second transmission medium. The electronic apparatus includes a name list relay section, a content list relay section, and a content identification information relay section. The name list relay section receives, from the operation apparatus through the second transmission medium, a request to obtain a list of names of the accumulation apparatuses connected to the first transmission medium, inquires of the accumulation apparatuses the names of the accumulation apparatuses based on the request, and transmits the list of the names of the accumulation apparatuses obtained from the accumulation apparatuses to the operation apparatus through the second medium. The content list relay section receives, from the operation apparatus through the second transmission medium, a request to obtain a list of contents accumulated in one of the accumulation apparatuses which corresponds to a name selected from the list of the names, receives the list of the contents from the accumulation apparatus based on the request, and transmits the list of the contents to the operation apparatus through the second transmission medium. The content identification information relay section receives, from the operation apparatus through the second transmission medium, a notification including identification information of the contents and identification information of the accumulation apparatus that is a notification destination and transmits identification information of a content to which a parental lock is set to the accumulation apparatus in which the contents are accumulated.

According to the embodiment of the present invention, the electronic apparatus includes the relay section between the operation apparatus and the accumulation apparatuses, and therefore the two-way communication is realized not between the operation apparatus and one accumulation apparatus but between the operation apparatus and the network.

As described above, according to the operation apparatus and the content parental lock setting method of the embodiments of the present invention, it is possible to communicate, through the wireless medium, with the electronic apparatus capable of communicating, through the network, with the accumulation apparatuses capable of accumulating the contents, with the result that the parental lock can be easily and reliably set. According to the electronic apparatus of the embodiment of the present invention, it is possible to communicate, through the network, with the one or more accumulation apparatuses capable of accumulating the contents, and it is possible to communicate with the operation apparatus through the wireless medium. As a result, the two-way communication is realized not between the operation apparatus and the one accumulation apparatus but between the operation apparatus and the network.

These and other objects, features and advantages of the present invention will become more apparent in light of the following detailed description of best mode embodiments thereof, as illustrated in the accompanying drawings.

BRIEF DESCRIPTION OF DRAWINGS

FIG. 9 is a diagram showing sets of apparatus IDs and server names predetermined;
FIG. 10 is a diagram showing a server list table;
FIG. 11 is a diagram showing a server selection screen;
FIG. 12 is a diagram showing a content list table;
FIG. 13 is a diagram showing a content management table;
FIG. 14 is a diagram showing a content selection screen;
FIG. 15 is a diagram showing a menu screen;
FIG. 16 is a diagram showing a parental unlock code input screen;
FIG. 17 is another diagram showing the content management table;
FIG. 23 is another diagram showing the content management table;
FIG. 24 is another diagram showing the content management table;
FIG. 25 is a diagram showing a dialog screen.

DESCRIPTION OF PREFERRED EMBODIMENTS

Figure 1:
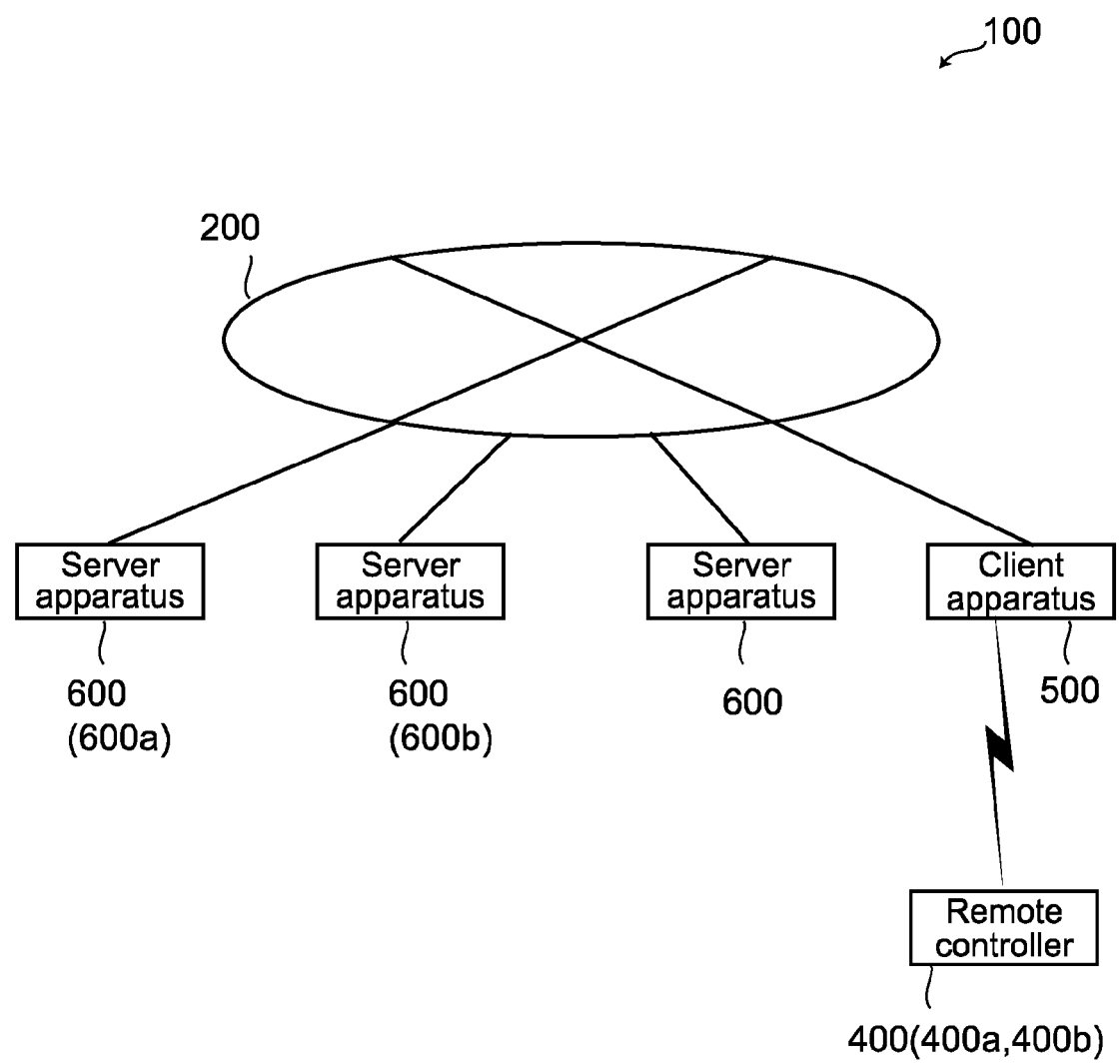
FIG. 1 is a diagram showing an overall structure of a content management system according to an embodiment of the present invention.

Hereinafter, an embodiment of the present invention will be described with reference to the drawings.
(Structure of Content Management System 100)
FIG. 1 is a diagram showing an overall structure of a content management system 100 according to an embodiment of the present invention.

The content management system 100 includes at least one client apparatus 500 and a plurality of server apparatuses 600 (600a, 600b). The client apparatus 500 and each of the plurality of server apparatuses are connected with each other via a home network 200 serving as a local area network so as to communicate with each other.

It should be noted that in this embodiment, the plurality of server apparatuses are referred to as the server apparatus 600 when collectively treated with no distinction or referred to as the server apparatus 600a or 600b when individually treated.

A remote controller 400 can perform two-way communication with at least the client apparatus 500 out of the client apparatus 500 and the server apparatus 600.

The server apparatus 600 of this embodiment can record and reproduce content data of programs momentarily broadcasted by broadcast stations, such as terrestrial digital broadcasting, CS digital broadcasting, and BS digital broadcasting. The server apparatus 600 can deliver content data to the client apparatus 500 via the home network 200.

The client apparatus 500 includes a display screen and a speaker. Therefore, when receiving content data delivered from the server apparatus 600 via the home network 200, the client apparatus 500 can display an image of the data on the display screen or output audio of the data from the speaker.
(Hardware Structure of Client Apparatus 500)

Figure 2:
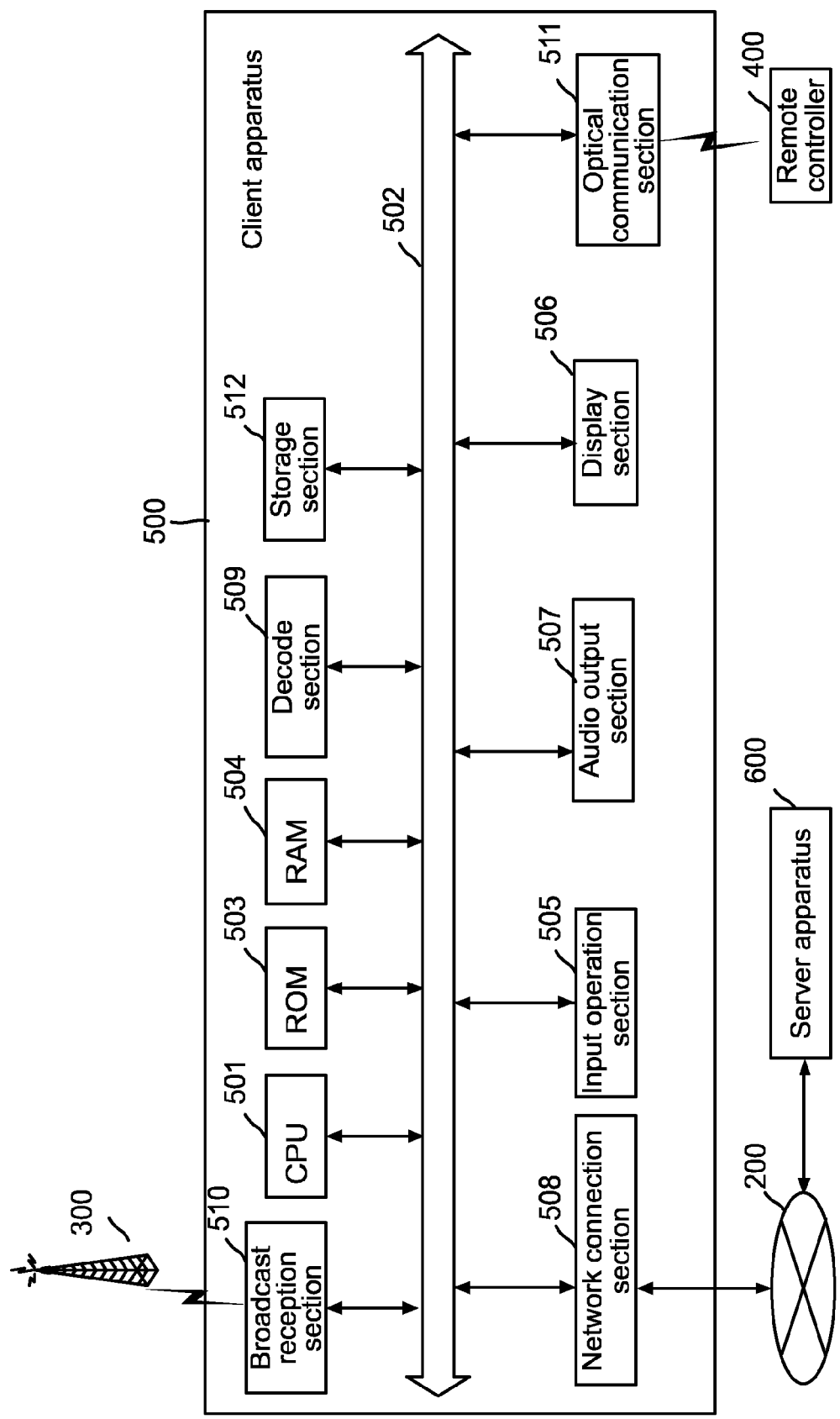
FIG. 2 is a block diagram showing a hardware structure of a client apparatus.

A description will be given on the client apparatus 500. FIG. 2 is a block diagram showing a hardware structure of the client apparatus 500.

As shown in FIG. 2, to a CPU (central processing unit) 501, a ROM (read only memory) 503, a RAM (random access memory) 504, an input operation section 505, and a display section 506 are connected via a system bus 502. Further, an audio output section 507, a network connection section 508, a decode section 509, a broadcast reception section 510, and an optical communication section 511 are connected to the CPU 501 via the system bus 502.

The input operation section 505 includes various keys or the like. A user processes inputs of various commands or data with the input operation section 505. The commands input by the user with the input operation section 505 are supplied to the CPU 501 via the system bus 502 with an input interface section (not shown).

The display section 506 is constituted of a display device including a display screen such as an LCD (liquid crystal display) and a display control circuit that drives the display device, for example. The audio output section 507 is constituted of a circuit that converts a digital audio signal to an analog audio signal, a speaker, and the like.

The network connection section 508 processes wire or wireless connection with the home network 200. To the home network 200, the server apparatus 600 is linked through wire or wireless connection.

The broadcast reception section 510 receives broadcast waves of the terrestrial digital broadcasting, CS digital broadcasting, BS digital broadcasting, or the like, which are delivered from each broadcast station 300, and demodulates a video signal and an audio signal, for example.

The decode section 509 decodes content data read from a storage section 512 and recovers digital video data and digital audio data. The recovered digital video data is supplied to the display section 506 via the system bus 502 and displayed. The recovered digital audio data is supplied to the audio output section 507 via the system bus 502 and output as audio from the speaker.

The optical communication section 511 is an interface for processing the two-way communication with the remote controller 400. Specifically, the optical communication section 511 communicates with an external apparatus by using light such as an infrared ray as a wireless medium. In addition to light, another wireless medium such as a radio wave, a sound wave, and an electromagnetic wave may be used.

The ROM 503 is a read-only memory that permanently stores programs or data for software processing to be executed by the client apparatus 500. It is to be noted that the program may be stored in the storage section 512. The ROM 504 is a writable volatile memory used for loading a program code executed by the CPU 501 or writing work data of the program. The CPU 501 performs overall control on the respective sections mentioned above and controls exchange of data between the sections. In addition, in order to execute the software processing to be executed by the client apparatus 500, the CPU 501 loads the program from the storage section 512 or the ROM 503 to the RAM 504 and interprets and executes the program.

(Hardware Structure of Server Apparatus 600)

Figure 3:
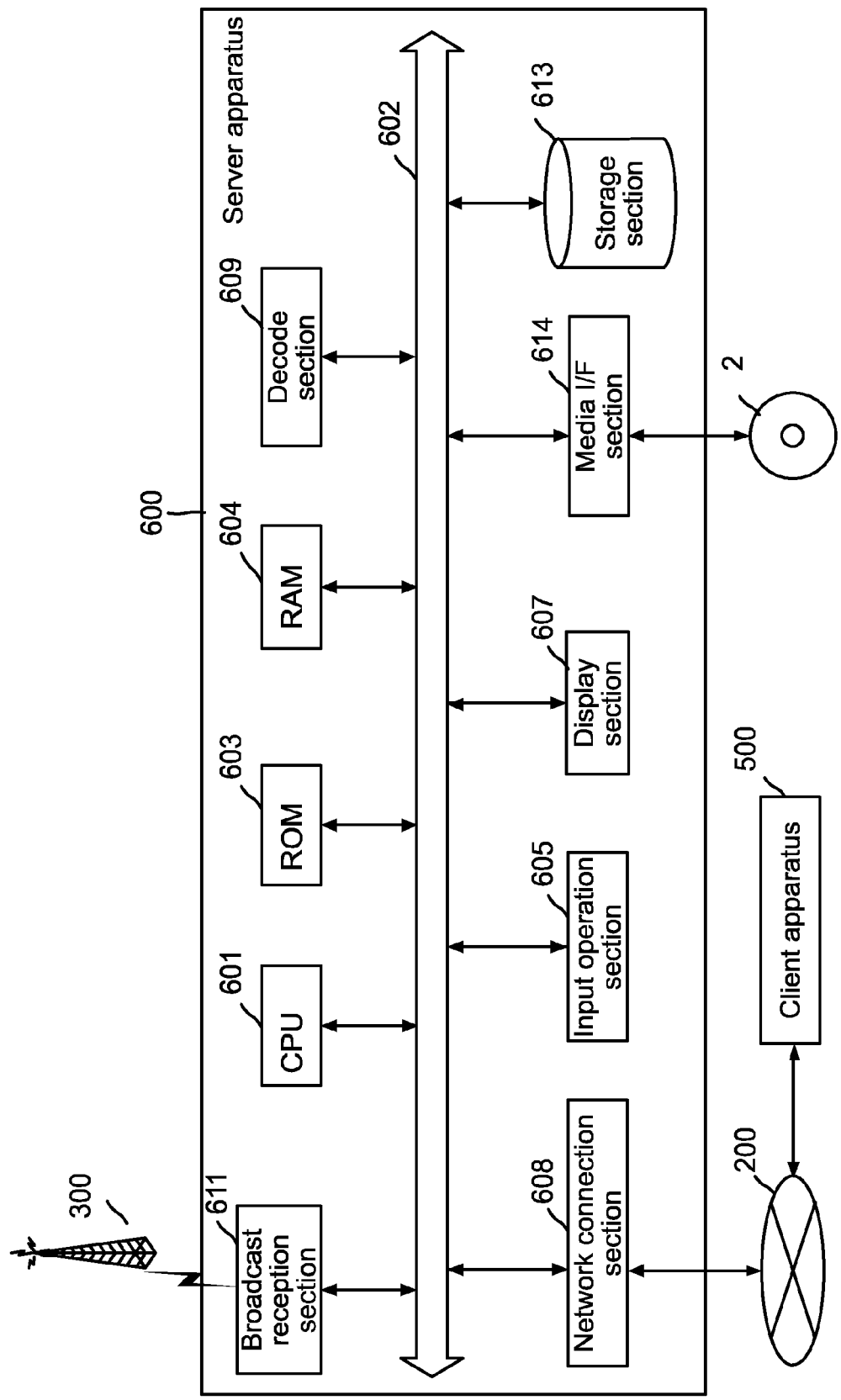
FIG. 3 is a block diagram showing a hardware structure of a server apparatus.

Next, a description will be given on the server apparatus 600. FIG. 3 is a block diagram showing a hardware structure of the server apparatus 600.

As shown in FIG. 3, to a CPU 601, a ROM 603, a RAM 604, an input operation section 605, and a display section 607, a network connection section 608, and a decode section 609 are connected via a system bus 602. Further, a broadcast reception section 611, a storage section 613 formed of an HDD (hard disk drive) or the like, and a media interface section 614 are connected to the CPU 601 via the system bus 602.

The input operation section 605 includes various keys or the like and processes inputs of various commands for record and reproduction from the user. The commands input with the input operation section 605 are transmitted to the CPU 601 via the system bus 602 with an input interface section (not shown).

The display section 607 is constituted of a display device including a display screen such as an LCD and a display control circuit that drives the display device, for example. The display section 607 displays confirmation of the commands or data input by the user or various statuses, for example.

The broadcast reception section 611 receives broadcast waves of the terrestrial digital broadcasting, CS digital broadcasting, BS digital broadcasting, or the like, which are delivered from each broadcast station 300 and demodulates a video signal and an audio signal, for example.

The network connection section 608 processes connection with the home network 200. The network connection section 608 processes inputs or outputs of the video signal and the audio signal between the network connection section 608 and the client apparatus 500 connected to the server apparatuses 600 via the home network 200.

The decode section 609 decodes content data read from the storage section 613 and recovers video data and audio data. The recovered digital video data is supplied to the network connection section 608 via the system bus 602 and output to the client apparatus 500 connected to the network connection section 608.

The storage section 613 is formed of the HDD or the like. The content data of a broadcast program or the like that is encoded by an encode section 610, a content management table (described below), and the like are recorded on the storage section 613.

To the media interface section 614, a removable medium 2 such as an optical disc can be loaded. The content data of the broadcast program or the like can be recorded on the removable medium 2. Examples of the removable medium 2 include a recordable or rewritable DVD (digital versatile disc) and a Blu-ray.

In the ROM 603, a program or the like for software processing to be executed by the server apparatus 600 is stored. The ROM 604 is a writable volatile memory used for loading a program code executed by the CPU 601 or for writing work data of the program. In addition, in order to execute the software processing to be executed by the server apparatus 600, the CPU 601 loads the program from the ROM 603 to the RAM 604 and interprets and executes the program.

(Hardware Structure of Remote Controller 400)

Figure 4:
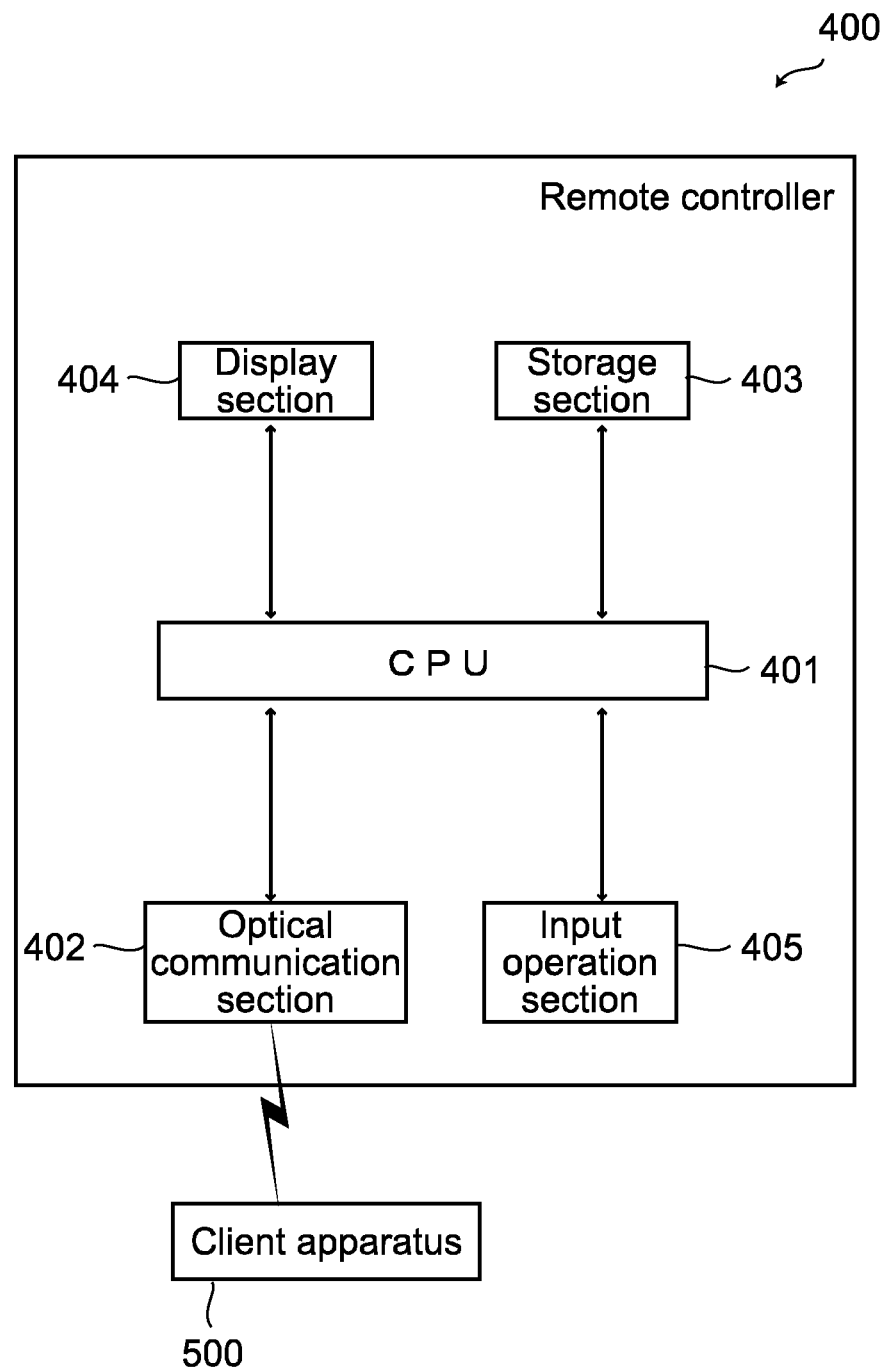
FIG. 4 is a block diagram showing a hardware structure of a remote controller.

Next, with reference to FIG. 4, a hardware structure of the remote controller 400 will be described. FIG. 4 is a block diagram showing the hardware structure of the remote controller 400.

As shown in FIG. 4, the remote controller 400 is constituted of a CPU 401, an optical communication section 402, a storage section 403, a display section 404, and an input operation section 405.

The optical communication section 402 is an interface that selectively performs two-way optical communication with the client apparatus 500. More specifically, in a case where there are a plurality of client apparatuses 500, the optical communication section 402 selects a communication target from among the client apparatuses 500, and the optical communication section 402 can input various operation signals for remote control to the selected client apparatus 500 and receive various data from the selected apparatus. In addition to light, another wireless medium such as a radio wave, a sound wave, and an electromagnetic wave may be used.

The display section 404 displays an operation method of the input operation section 405 for performing remote control on the client apparatus 500 and displays to the user a list of apparatuses 600 and a list of contents that can be obtained from the individual server apparatuses 600.

The input operation section 405 has a plurality of keys, and serves as a user interface that receives an input of, for example, various operation signals and selection from the list by the user and notifies the CPU 401 of the input. It should be noted that the keys of the input operation section 405 may be touch-sensitive keys displayed on a screen of the display section 404.

The storage section 403 stores various tables and the like created based on information obtained from the respective server apparatuses through the client apparatus 500.

(Software Structure of Client Apparatus 500)

Figure 5:
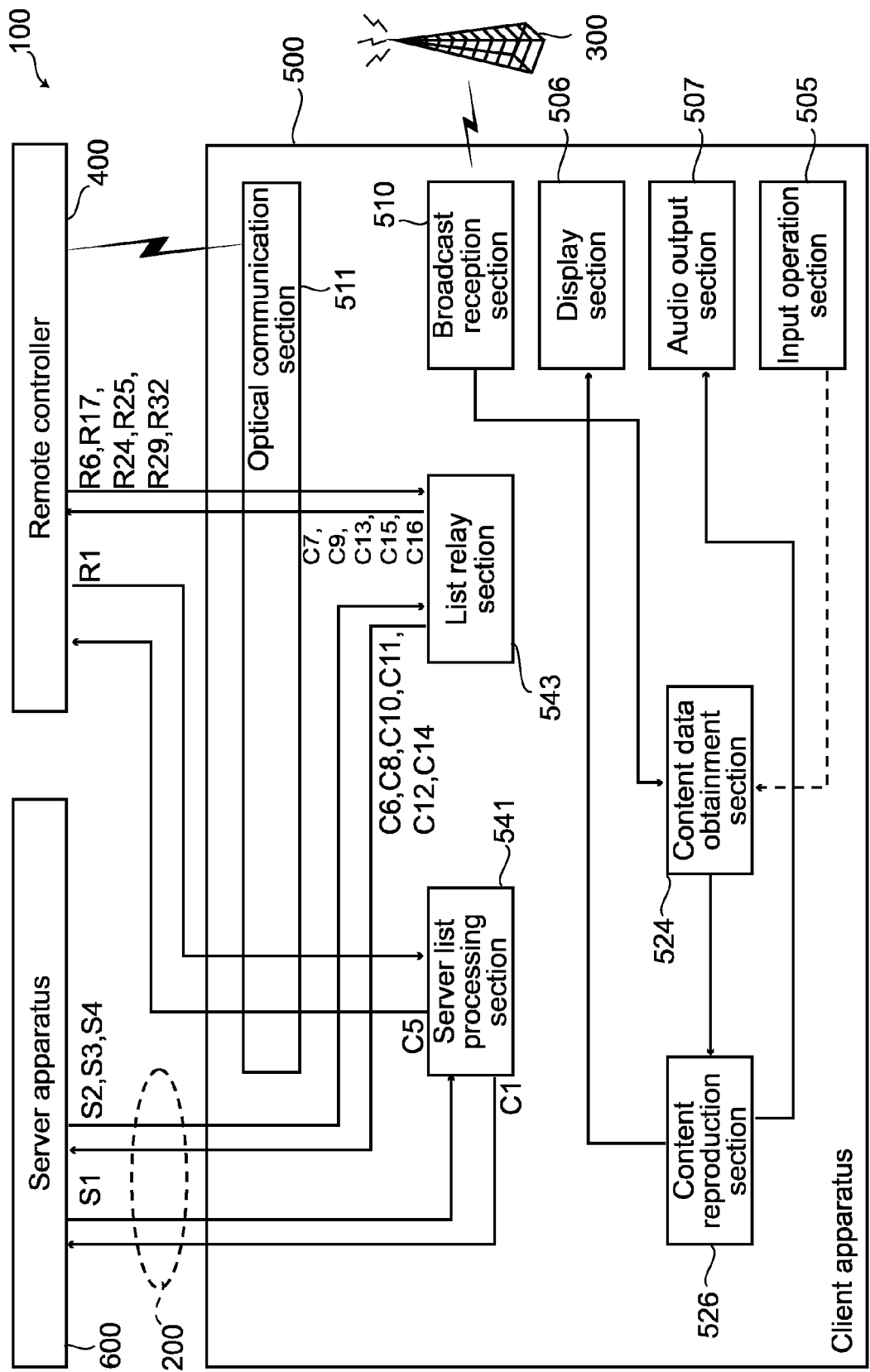
FIG. 5 is a diagram showing a software structure of the client apparatus.

Next, a software structure of the client apparatus 500 will be described with reference to FIG. 5. FIG. 5 is a diagram showing the software structure of the client apparatus 500.

As shown in FIG. 5, the client apparatus 500 includes a content data obtainment section 524, a content reproduction section 526, a server list processing section 541, and a list relay section 543.

The content data obtainment section 524 selectively obtains content data sent from the server apparatus 600 via the home network 200 or content data such as the broadcast programs received at the broadcast reception section 510 of the client apparatus 500, and supplies the obtained data to the content reproduction section 526.

The content reproduction section 526 decodes the content data supplied from the content data obtainment section 524 by using the decode section 509 and recovers the digital video data and the digital audio data. The content reproduction section 526 outputs the recovered digital video data to the display section 506 to cause the display section 506 to display the digital video data, and outputs the digital audio data to the audio output section 507 to cause the audio output section 507 to output the digital audio data.

The server list processing section 541 transmits a request C1 of inquiring a server name to the server apparatuses 600 connected to the home network 200 via the home network 200. Further, the server list processing section 541 receives a request R1 (described below) from the remote controller 400 and transmits, to the remote controller 400, a response C5 including a server list in which apparatus IDs previously assigned to each server apparatus 600 and server names predetermined are put together.

The list relay section 543 receives a content list obtainment request R6 from the remote controller 400 and transmits, to the server apparatus 600, a content list obtainment request C6 via the home network 200.

It should be noted that in this embodiment, a television or a personal computer is considered as an example of the client apparatus 500, but the client apparatus 500 of this embodiment of the present invention is not limited to those apparatuses and may have any form as long as it includes the elements shown in FIGS. 2 and 5.

(Software Structure of Server Apparatus 600)

Figure 6:
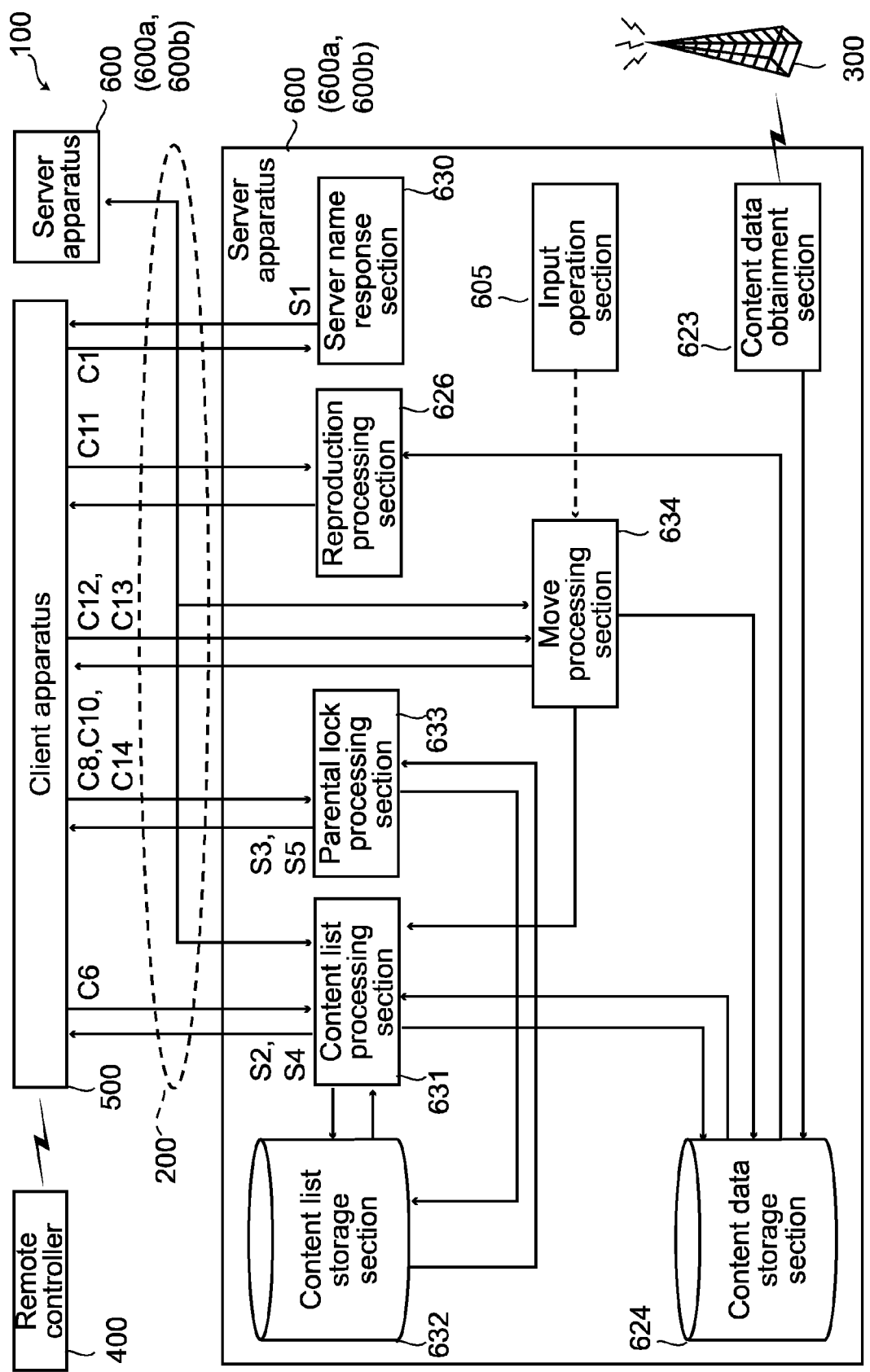
FIG. 6 is a diagram showing a software structure of the server apparatus.

Next, a software structure of the server apparatus 600 will be described with reference to FIG. 6. FIG. 6 is a diagram showing the software structure of the server apparatus 600.

As shown in FIG. 6, the server apparatus 600 includes a content data obtainment section 623, a content data storage section 624, a reproduction processing section 626, a server name response section 630, a content list processing section 631, a content list storage section 632, and a parental lock processing section 633. The server apparatus 600 further includes a move processing section 634. Here, the content data storage section 624 and the content list storage section 632 are set in the storage section 613 or the removable medium 2 or the like loaded to the media interface section 614.

The content data obtainment section 623 selectively receives content data of a broadcast program or the like that is broadcasted from the broadcast station 300 and registers the received content data in the content data storage section.

The reproduction processing section 626 performs a processing so that corresponding content data is read from the content data storage section 624, the content data is decoded by the decode section 609, and the recovered digital video data and digital audio data are supplied to the network connection section 608.

Upon reception on the request C1 from the client apparatus 500, the server name response section 630 creates a set of an apparatus ID previously assigned to the server apparatus to which the server name response section 630 belongs (which will be referred to as the server apparatus itself) and a server name predetermined, and transmits a response S1 including the set to the client apparatus 500.

The content list processing section 631 receives the content list obtainment request C6 from the client apparatus 500, reads sets of content IDs and titles of programs from the content data storage section 624, and creates a content list table including the sets. The content list processing section 631 transmits a response S2 including the content list including the sets of the content IDs and the titles of programs to the client apparatus 500 via the home network 200.

The parental lock processing section 633 receives a parental lock setting request C8 including sets with content IDs and titles of programs from the client apparatus 500, creates a parental lock list table, and stores the created parental lock list table in the content list storage section 632. Further, the parental lock processing section 633 transmits a parental lock setting completion notification S3 to the client apparatus 500 via the home network 200.

The move processing section 634 receives a move request C12 from the client apparatus 500 via the home network 200. The move processing section 634 performs a predetermined operation for moving a content from the apparatus itself to another server apparatus 600. When the move operation is over, the move processing operation 634 sends a move completion notification to the content list processing section 631 and sends the move completion notification to the server apparatus 600.

(Software Structure of Remote Controller 400)

Figure 7:
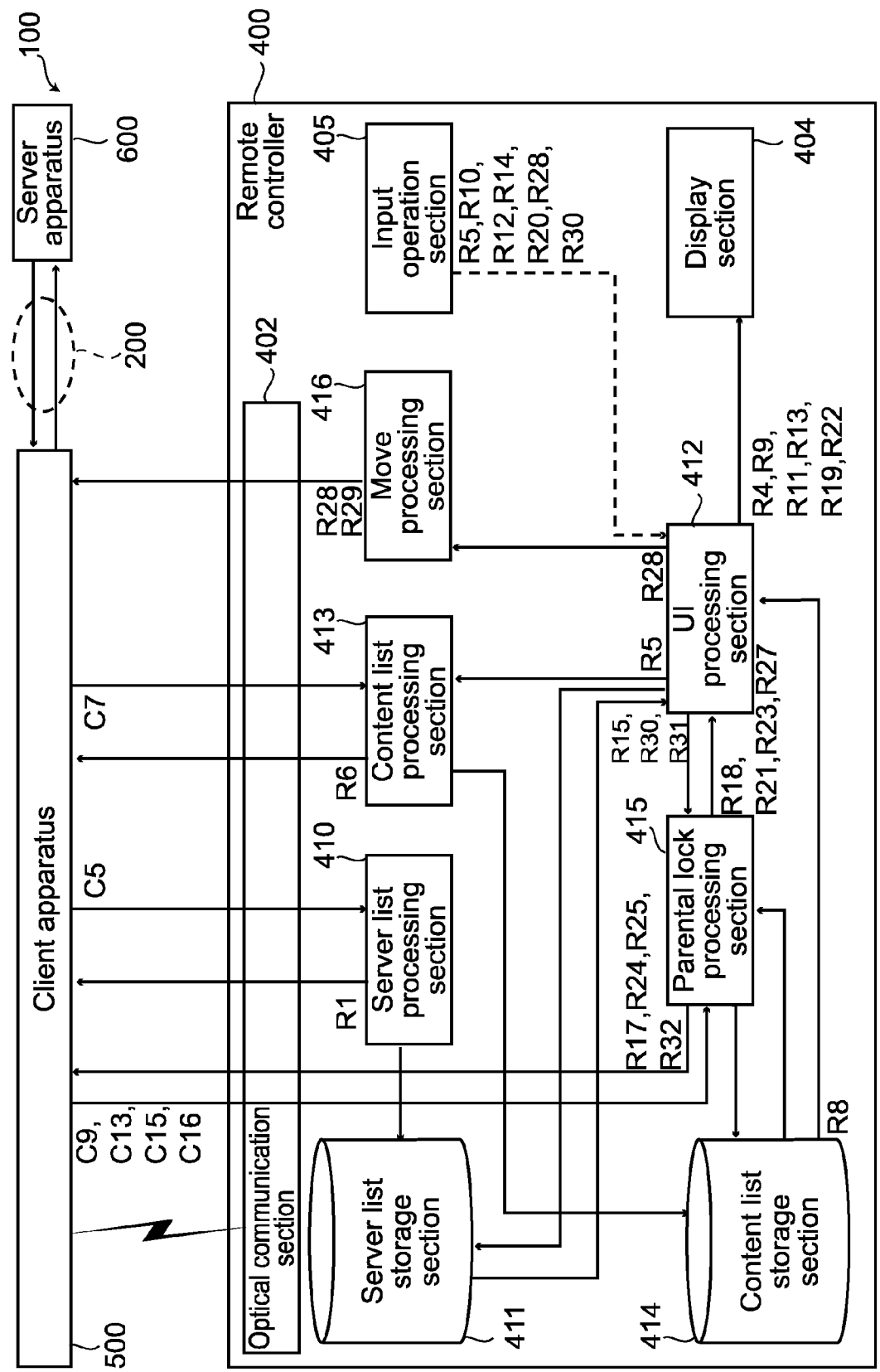
FIG. 7 is a diagram showing a software structure of the remote controller.

Next, a software structure of the remote controller 400 will be described with reference to FIG. 7. FIG. 7 is a diagram showing the software structure of the remote controller 400.

The remote controller 400 includes a server list processing section 410, a server list storage section 411, a UI (user interface) processing section 412, a content list processing section 413, a content list storage section 414, a parental lock processing section 415, and a move processing section 416. Here, the server list storage section 411 and the content list storage section 414 are set to the storage section 403.

The server list processing section 410 transmits, to the client apparatus 500, the request R1 including a list of the apparatus IDs and the server names, and receives the response C5 including a server list of the apparatus IDs and the server names from the client apparatus 500.

The UI processing section 412 supplies various display requests (described below) to the display section 404 and causes the display device to display various display screens corresponding to the display requests.

The content list processing section 413 transmits to the content list obtainment request R6 to the client apparatus 500 and receives a response C7 including a content list in which sets of content IDs and titles of programs are put together. Based on the content IDs and the titles of the programs that are included in the response C7 received, the content list processing section 413 registers them in the content management table stored in the content list storage section 414.

The parental lock processing section 415 receives a parental lock setting completion notification C9 from the client apparatus 500 and outputs a parental lock setting completion notification R18 to the UI processing section 412. In addition, the parental lock processing section 415 creates a set of a parental lock, a content ID, and an apparatus ID, with respect to which the parental lock is set, and transmits a parental lock setting notification R17 including the set created to the client apparatus 500, for example.

The move processing section 416 is used when the content is moved between the server apparatuses 600. The move processing section 416 receives a move destination notification R28 from the UI processing section 412 and transmits a move request R29 to the client apparatus 500.

It should be noted that a remote controller for home electronics, which is capable of performing the two-way communication, is considered as an example of the remote controller 400 of this embodiment, but the remote controller 400 of this embodiment of the present invention is not limited to this example and may have any form as long as it includes the elements shown in FIGS. 4 and 7. For example, the remote controller 400 may be a cellular phone capable of performing two-way infrared communication.

(Setting Operation of Parental Lock by Content Management System 100)

Figure 8:
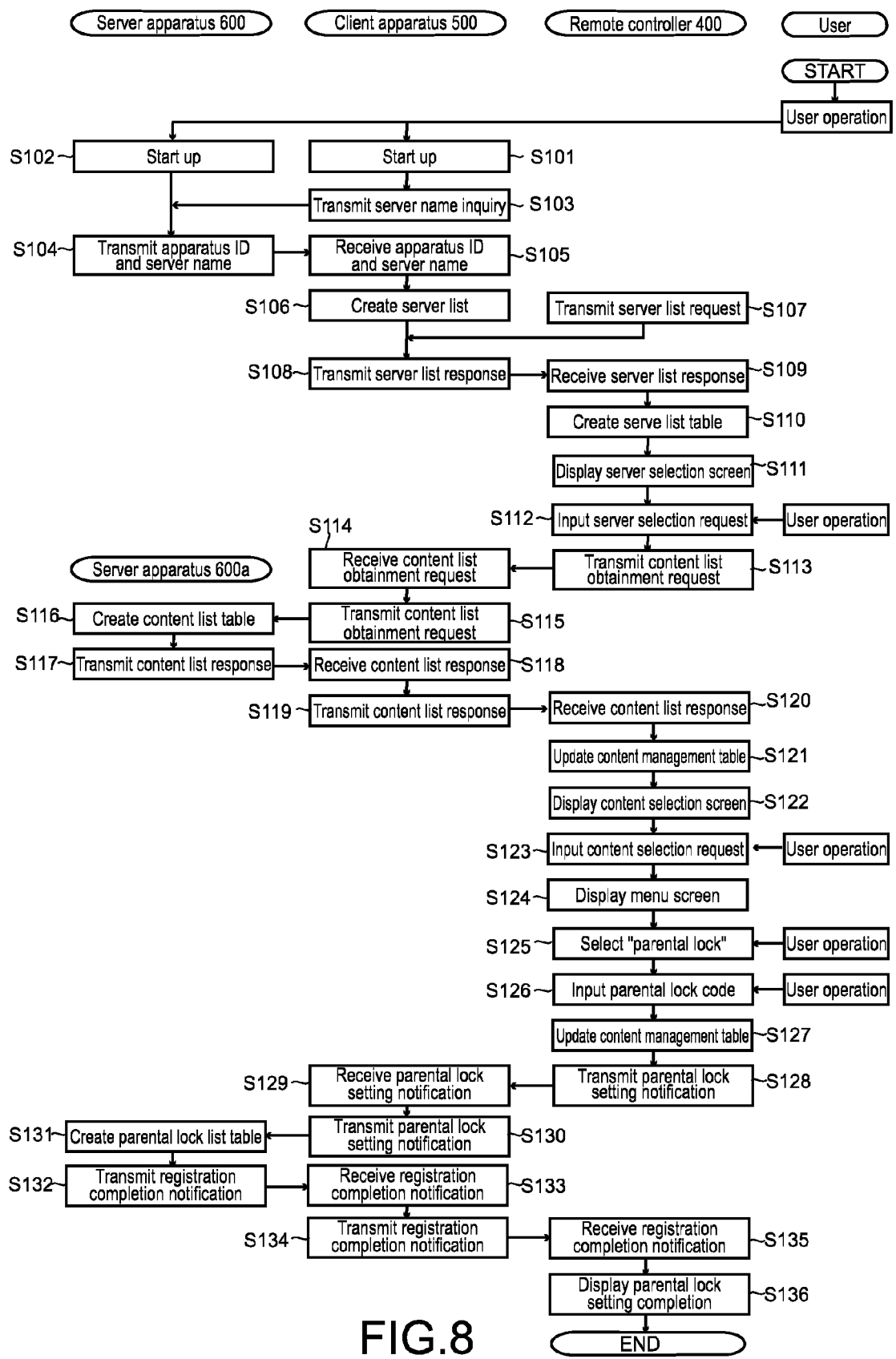
FIG. 8 is a flowchart showing an operation of setting a parental lock by the content management system.

Next, a description will be given on a setting operation of the parental lock by the content management system 100 with reference to FIG. 8. FIG. 8 is a flowchart showing an operation of setting the parental lock by the content management system 100.

As shown in FIG. 8, when the user performs an operation on the client apparatus 500 for starting up the client apparatus 500, the client apparatus 500 is started up (Step S101). Further, when the user performs an operation on the server apparatus 600 for starting up the server apparatus 600, each of the server apparatus 600 is started up (Step S102).

When started up, the client apparatus 500 causes the server list processing section 541 to start up. The server list processing section 541 transmits, via the home network 200, the request C1 of inquiring a server name to each of the server apparatuses 600 connected to the home network 200 (Step S103).

On the other hand, when started up, the server apparatuses 600 connected to the home network 200 cause the server name response sections 630 to start up, respectively. Upon reception of the request C1 from the server list processing section 541 of the client apparatus 500, the server name response sections 630 of the respective server apparatuses 600 each create a set of an apparatus ID 701 previously assigned to each of the server apparatuses themselves and a server name 702 predetermined (shown in FIG. 9). The server name response sections 630 of the server apparatuses 600 each transmit, to the client apparatus 500 via the home network 200, the response S1 including the set of the apparatus ID 701 and the server name 702 that are created (Step S104).

The server list processing section 541 of the client apparatus 500 receives the response S1 including the set of the apparatus ID 701 previously assigned to each of the apparatuses and the server name 702 predetermined from each of the server apparatuses 600 via the home network 200 (Step S105). Next, the server list processing section 541 creates a server list of the sets included in each of the responses S1 received from the server apparatuses 600 (Step S106).

On the other hand, the server list processing section 410 of the remote controller 400 transmits the request R1 including the sets of the apparatus IDs 701 and the server names 702 to the client apparatus 500 by using the optical communication section 402 (Step S107).

The server list processing section 541 of the client apparatus 500 receives the request R1 including the sets of the apparatus IDs 701 and the server names 702 from the server list processing section 410 of the remote controller 400 by using the optical communication section 511. The server list processing section 541 that has received the request R1 including the sets of the apparatus IDs 701 and the server names 702 transmits the response C5 including the server list in which the apparatus IDs 701 and the server names 702 are put together to the remote controller 400 by using the optical communication section 511 (Step S108).

The server list processing section 410 of the remote controller 400 receives the response C5 including the server list of the apparatus IDs 701 and the server names 702 from the server list processing section 541 of the client apparatus 500 (Step S109). Upon reception of the response C5 including the server list of the apparatus IDs 701 and the server names 702, the server list processing section 410 creates a server list table 710 based on the obtained server list and stores the server list table 710 in the server list storage section 411 (Step S110).

As shown in FIG. 10, the server list table 710 is a table having an apparatus ID field 711 and a server name field 712. For each record of the server list table 710, the apparatus ID 701 is registered in the apparatus ID field 711, and the server name 702 is registered in the server name field 712. The apparatus IDs 701 and the server names 702 are associated with each other.

On the other hand, the UI processing section 412 reads the server name 702 registered in the server list table 710 from the server list table 710 stored in the server list table storage section 411. The UI processing section 412 creates a server selection screen 800 (shown in FIG. 11) that indicates a list of the server names 702 based on the read server names 702. The UI processing section 412 supplies, to the display section 404, a display request R4 including display data of the server selection screen 800 that indicates the list of the server names 702 (Step S111).

As shown in FIG. 11, the server selection screen 800 serves as a user interface for displaying the list of the server names 702 and causing the user to select any one from the server apparatuses 600. In the example of FIG. 11, the list of the names of the server apparatuses 600 such as "Living Room 1", "Network HDD", and "Juke Box" is displayed on the server selection screen 800.

The display section 404 receives the display request R4 including display data of the server selection screen 800 from the UI processing section 412 and displays the server selection screen 800 on the display screen thereof. The user references the server names of the server selection screen 800 displayed on the display section 404 and selects one (server apparatus 600a) from among the server apparatuses 600 by using the input operation section 405. The input operation section 405 supplies, to the UI processing section 412, a server selection request R5 including selection information of the server name selected by the user. Upon reception of the server selection request R5, the UI processing section 412 supplies the server selection request R5 to the content list processing section 413 (Step S112).

Upon reception of the server selection request R5 from the UI processing section 412, the content list processing section 413 reads an apparatus ID of the server apparatus 600a corresponding to the server name from the server list table 710 based on the selection information of the server name included in the server selection request R5. The content list processing section 413 transmits the content list obtainment request R6 including the read apparatus ID 701 to the client apparatus 500 by using the optical communication section 511 (Step S113).

The list relay section 543 of the client apparatus 500 receives the content list obtainment request R6 from the content list processing section 413 of the remote controller 400 (Step S114). The list relay section 543 transmits, via the home network 200, the content list obtainment request C6 to the server apparatus 600a to which the apparatus ID included in the content list obtainment request R6 is previously assigned (Step S115).

The content list processing section 631 of the server apparatus 600a receives the content list obtainment request C6 from the list relay section 543 of the client apparatus 500 via the home network 200. Upon reception of the content list obtainment request C6, the content list processing section 631 sets a content list table to the content list storage section 632. The content list processing section 631 extracts the content IDs and the titles of the programs of all the contents stored in the content data storage section 624 from SI (service information) information. The content list processing section 631 registers the extracted information in a content list table 720 provided for the content list storage section 632 (Step S116).

As shown in FIG. 12, the content list table 720 is constituted of a content ID field 721, a program title field 722, and a parental lock flag field 733. Information items registered in those fields 721, 722, and 733 are information for each server apparatus and associated with each other. The parental lock flag refers to a flag for setting of whether parental lock is set for a content. An initial value of the parental lock flag is "without parental lock". It should be noted that the SI information is information periodically distributed by a content distributor via a network, and the server apparatuses 600 each receive the SI information and always have latest SI information. The SI information includes various information items relating to the content, such as a content ID, a title of a program, a distribution time, and details of a program.

Next, the content list processing section 631 of the server apparatus 600a creates a content list including the content IDs and the titles of the programs of all the contents in the content list table 720. The content list processing section 631 of the server apparatus 600a transmits the response S2 including the created content list to the client apparatus 500 via the home network 200 (Step S117).

The list relay section 543 of the client apparatus 500 receives the response S2 including the content list from the server apparatus 600a via the home network 200 (Step S118). The list relay section 543 transmits, to the remote controller 400 by using the optical communication section 511, the response S2 including the content list received from the server apparatus 600a as the response C7 (Step S119).

The content list processing section 413 of the remote controller 400 receives the response C7 including the content list from the list relay section 543 of the client apparatus by using the optical communication section 402 (Step S120). The content list processing section 413 sets a content management table 730 to the content list storage section 414 and registers, in the content management table 730, the content IDs and the titles of the programs in the content list included in the response C7 received from the client apparatus 500 (Step S121).

As shown in FIG. 13, the content management table 730 is constituted of a content ID field 731, a program title field 732, a parental lock flag field 733, a parental unlock code field 734, and an apparatus ID filed 736.

The UI processing section 412 of the remote controller 400 reads all the program titles registered in the content management table 730 from the content list storage section 414 (R8). The UI processing section 412 creates display data of a content selection screen 810 including the content list of all the program titles read and supplies a display request R9 including the display data of the content selection screen 810 to the display section 404 (Step S122). As a result, the content selection screen 810 is displayed on the screen of the display section 404.

As shown in FIG. 14, the content selection screen 810 serves as a user interface for displaying a list of the program titles of all the contents accumulated in the server apparatus selected by the user and causing the user to select any one from the contents.

The user uses the input operation section 405 to select a content with respect to which the user wants to perform reproduction or set the parental lock from among the program titles displayed on the content selection screen 810. The input operation section 405 supplies selection information R10 of the program title to the UI processing section 412 (Step S123).

It should be noted that in this embodiment, the content selection screen 810 or various screens (described below) are displayed on the display screen of the remote controller 400, but where to display those screens is not limited to this case. Those screens may be displayed on the display device of the display section 506 of the client apparatus 500.

Upon reception of the selection information R10 from the input operation section 405, the UI processing section 412 creates display data of a menu screen 801 (shown in FIG. 15) as a list of processings that can be performed on the content of the program title selected. Further, the UI processing section 412 supplies a display request R11 including the display data of the menu screen 801 to the display section 404 (Step S124). As a result, the menu screen 801 is displayed on the screen of the display section 404.

As shown in FIG. 15, the menu screen 801 serves as a user interface for displaying a list of processing commands that can be executed with respect to the selected content and causing the user to select a processing command that has to be executed with respect to the selected content. On the menu screen 801, character strings that indicate the processing commands to be executed with respect to the content, such as "reproduction", "parental lock", and "move", are displayed. The "reproduction" refers to a processing of reproducing data of the content held by the server apparatus 600 by the client apparatus 500, and the "parental lock" refers to a processing of setting the parental lock with respect to the content. The "move" refers to a processing of moving the content from one server apparatus 600 to another.

A description will be given on a case where the execution of the processing of the "parental lock" is specified to the menu screen 801 by the user by using the input operation section 405. In this case, the input operation section 405 supplies selection information R12 of the processing of the "parental lock" to the UI processing section 412 (Step S125).

Upon reception of the selection information R12 of the processing of the "parental lock" from the input operation section 405, the UI processing section 412 subsequently creates display data of a parental unlock code input screen 802 (shown in FIG. 16) and supplies a display request R13 including the display data to the display section 404. As a result, the parental unlock code input screen 802 is displayed on the screen of the display section 404.

As shown in FIG. 16, the parental unlock code input screen 802 serves as a user interface for causing the user to input a code necessary for releasing the parental lock that is set to the content. On the parental unlock code input screen 802, a message for guiding the user, e.g., "input parental unlock code", input boxes of, e.g., a four-digit parental unlock code, and the like are displayed.

The user references the parental unlock code input screen 802 displayed on the display section 404 and inputs the parental unlock code by using the input operation section 405. The input operation section 405 supplies a parental unlock code R14 input by the user to the UI processing section 412.

Upon reception of the parental unlock code R14 from the input operation section 405, the UI processing section 412 causes the parental unlock code to be displayed on the parental unlock code input screen 802 of the display section 404 (Step S126).

Further, the UI processing section 412 supplies a parental lock setting request including the parental unlock code to the parental lock processing section 415. Upon reception of the parental lock setting request from the UI processing section 412, the parental lock processing section 415 performs registration in the content management table 730 stored in the content list storage section 414 as follows.

For example, as shown in FIG. 17, the parental lock processing section 415 sets a value corresponding to "with parental lock" as the parental lock flag to the parental lock flag field 733 that belongs to a record 735 in the content management table 730, and registers a parental unlock code in the parental unlock code field 734 that also belongs to the record 735 (Step S127).

When the registration in the content management table 730 is over, the parental lock processing section 415 transmits, to the client apparatus 500 by using the optical communication section 402, the parental lock setting notification R17 including the set of the apparatus ID and the content ID to which the parental lock is set (Step S128).

The list relay section 543 of the client apparatus 500 receives the parental lock setting notification R17 including the set of the apparatus ID and the content ID to which the parental lock is set from the remote controller 400 by using the optical communication section 511 (Step S129).

Upon reception of the parental lock setting notification R17, the list relay section 543 transmits the parental lock setting request C8 including the content ID included in the parental lock setting notification R17 to the server apparatus 600a corresponding to the apparatus ID included in the parental lock setting notification R17 (Step S130).

Upon reception of the parental lock setting request C8 from the client apparatus 500, the parental lock processing section 633 of the server apparatus 600a updates the content list table 720 stored in the content list storage section 632 based on the parental lock setting request C8 (Step S131).

Figures 18, 19, 20:
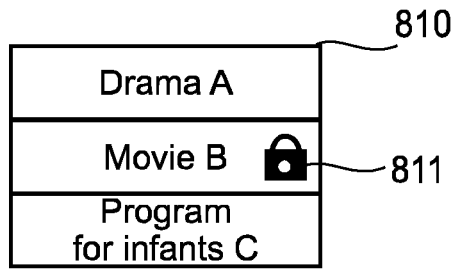
FIG. 18 is another diagram showing the content list table.
FIG. 19 is a diagram showing a user interface that indicates completion of the setting of the parental lock.
FIG. 20 is another diagram showing the content list table.

Specifically, as shown in FIG. 18, into the parental lock flag field 733 corresponding to the content ID included in the parental lock setting request C8, a value corresponding to "with parental lock" is set as the parental lock flag.

After that, the parental lock processing section 633 transmits the parental lock setting completion notification S3 to the client apparatus 500 via the home network 200 (Step S132).

Upon reception of the parental lock setting completion notification S3 from the server apparatus 600a (Step S133), the list relay section 543 of the client apparatus 500 transmits the parental lock setting completion notification C9 to the remote controller 400 by using the optical communication section 511 (Step S134).

Upon reception of the parental lock setting completion notification C9 from the client apparatus 500 (Step S135), the parental lock processing section 415 of the remote controller 400 outputs the parental lock setting completion notification R18 to the UI processing section 412.

The UI processing section 412 receives the parental lock setting completion notification R18 from the parental lock processing section 415. The UI processing section 412 creates display data of the content corresponding to the content ID included in the parental lock setting completion notification R18 and supplies the display data to the display section 404 (Step S136). It should be noted that in the display data, a graphic symbol indicating that the parental lock is already set is added to the column in which the program title is displayed on the content selection screen 810. As a result, the content selection screen 810 displayed on the display section 404 is updated as shown in FIG. 19, for example. In this way, a graphic symbol 811 indicating that the parental lock is already set is added to the column of displaying the program titles corresponding to the content to which the parental lock is set. The above is the description on the parental lock setting with respect to the specific content.

In a case where the parental lock is subsequently set with respect to another server apparatus 600b, the process of Steps S112 to S136 only has to be performed again.

That is, the user references the server selection screen 800 displayed on the display section 404 and selects the server apparatus 600b by using the input operation section 405. For example, in a case where the user selects a server name "Living Room 1" by using the input operation section 405, the input operation section 405 supplies the server selection request R5 including selection information of a processing for the server name "Living Room 1" selected by the user to the UI processing section 412. Upon reception of the server selection request R5 from the input operation section 405, the UI processing section 412 supplies the server selection request R5 to the content list processing section 413 (Step S112).

Upon reception of the server selection request R5 from the UI processing section 412, the content list processing section 413 reads an apparatus ID of the server apparatus 600b corresponding to the server name from the server list table 710 based on the selection information of the server name included in the server selection request R5. The content list processing section 413 transmits the content list obtainment request R6 including the read apparatus ID 701 to the client apparatus 500 by using the optical communication section 511 (Step S113).

The list relay section 543 of the client apparatus 500 receives the content list obtainment request R6 from the content list processing section 413 of the remote controller 400 (Step S114). The list relay section 543 transmits, via the home network 200, the content list obtainment request C6 to the server apparatus 600b to which the apparatus ID included in the content list obtainment request R6 is previously assigned (Step S115).

The content list processing section 631 of the server apparatus 600b receives the content list obtainment request C6 from the list relay section 543 of the client apparatus 500 via the home network 200. Subsequent operations are the same as those of Steps S116 to S136 described above.

By the setting operation of the parental lock described above, the content list storage section 414 of the remote controller 400 holds the content management table 730 in which the information (such as the program titles) on the contents accumulated in each of the server apparatuses 600, the parental lock flag indicating whether the parental lock is set, and the code for releasing the parental lock are registered. That is, it is possible to unify and manage the information relating to the parental lock setting with respect to the contents accumulated in the server apparatuses 600 by the remote controller 400, with the result that convenience for the user is improved. In addition, in a case where a minor has the server apparatus 600 in his/her own room, it is also possible to remotely set the parental lock by a parent or guardian by using the remote controller 400, for example.

It should be noted that in this embodiment, only the content list storage section 414 of the remote controller 400 holds the content management table 730 in which the parental unlock code is registered. On the other hand, in the content list table 720 stored in the content list storage section 632 of the server apparatus 600, the parental unlock code is not registered, and a flag indicating whether the parental lock is set is only set. However, the present invention is not limited to this example. Another content list table 720 may be created, and the parental unlock code may be corresponded to a flag and registered in the content list table 720. In this case, the user of the server apparatus 600 is not allowed to access the parental unlock code registered in the content list table 720 created.

FIG. 20 shows a structure of the content list table 720 used in this case. As shown in FIG. 20, the content list table 720 has a structure that includes the parental unlock field 734 in addition to the content ID field 721, the program title field 722, and the parental lock flag field 733.

In Step S128, when the registration in the content management table 730 is over, the parental lock processing section 415 transmits the parental lock setting notification R17 including the set of the apparatus ID, the content ID, with/without the parental lock, and the parental unlock code, as the information newly registered in the content management table 730.

In Step S129, the list relay section 543 of the client apparatus 500 receives the parental lock setting notification R17 including the set from the parental lock processing section 415 of the remote controller 400.

In Step S130, the list relay section 543 transmits the parental lock setting request C8 including the set of the content ID, the parental lock, and the parental unlock code that are included in the parental lock setting notification R17 to the server apparatus 600a corresponding to the apparatus ID included in the parental lock setting notification R17 received.

As described above, by registering the parental unlock code in the content list table 720 stored in the content list storage section 632 of the server apparatus 600, the server apparatus 600 can hold the parental unlock code for backup. Accordingly, it is possible not only to unify and manage the data relating to the parental lock setting or the like in the plurality of server apparatuses 600 by using the remote controller 400, but also to prevent the parental unlock code from being lost because of losing the remote controller 400.

The backup parental unlock code held in the server apparatus 600 is read from the content list table 720 by inputting a command and a password for referencing the parental unlock code to the server apparatus 600 or the client apparatus 500 by the user, for example. The parental unlock code read is displayed on the display section 506 of the client apparatus 500 or the display section 607 of the server apparatus 600. By referencing the parental unlock code displayed, the user can reregister the parental unlock code to the remote controller 400.

It should be noted that in this embodiment, the example in which one remote controller 400 is used is described, but the present invention is not limited to this. A plurality of remote controllers (400a, 400b) that respectively perform the two-way communication with a plurality of client apparatuses 500 connected to the home network 200 may be provided. In this case, the details of the update of the content management table 730 of the remote controller 400a may be transmitted to the remote controller 400b through the client apparatus 500 and reflected to the content management table 730 of the remote controller 400b.

Thus, for example, when the parental lock setting operation is performed by using the remote controller 400a of the parent or guardian, the parental lock information can be promptly set to the remote controller 400b of the minor, which improves the convenience for the user.

In addition, one of the remote controllers (400a or 400b) holds a backup parental unlock code of the other remote controller (400a or 400b), which is useful as a prevention measure of losing the parental unlock code due to losing of one of the remote controllers (400a or 400b).

(Setting Release Operation with Respect to Content to which Parental Lock is Set)

Figure 21:
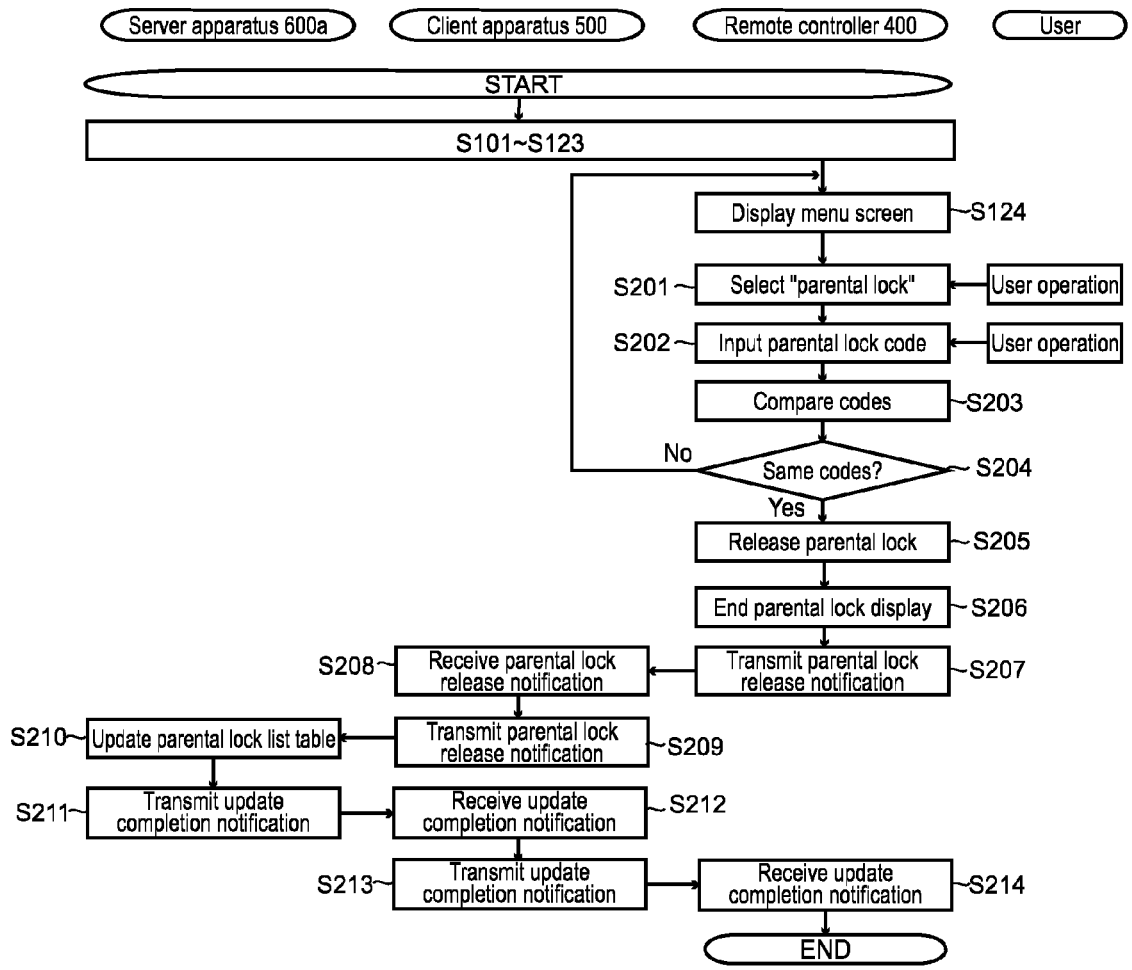
FIG. 21 is a flowchart showing a setting release operation of the parental lock by the content management system.

Next, a setting release operation of the parental lock will be described with reference to FIG. 21. FIG. 21 is a flowchart showing the setting release operation of the parental lock by the content management system 100.

As shown in FIG. 21, the operations of Steps S101 to S124 are performed. Let us assume that in Step S124, the user selects the execution of the processing of the "parental lock" by using the input operation section 405 on the menu screen 801 displayed on the screen of the display section 404 of the remote controller 400. The input operation section 405 supplies, to the UI processing section 412, the selection information R12 of the processing of the "parental lock" selected by the user (Step S201).

Upon reception of the selection information R12 of the "parental lock" processing from the input operation section 405, the UI processing section 412 creates the display data of the parental unlock code input screen 802 (shown in FIG. 16) based on the selection information R12 and supplies the display request R13 including the display data to the display section 404. As a result, the parental unlock code input screen 802 is displayed on the screen of the display section 404.

The user references the parental unlock code input screen 802 displayed on the display section 404 and inputs the parental unlock code by using the input operation section 405. The input operation section 405 supplies the parental unlock code R14 input by the user to the UI processing section 412.

Upon reception of the parental unlock code R14 from the input operation section 405, the UI processing section 412 causes the input parental unlock code to be displayed for confirmation on the parental unlock code input screen 802 of the display section 404. The user confirms whether the parental unlock code displayed is correct. When the parental unlock code is correct, the user presses a specific key of the input operation section 405 and inputs the fact that the parental unlock code to be input is decided (Step S202).

The input operation section 405 notifies the UI processing section 412 of the decision. In response to this notification, the UI processing section 412 supplies, to the parental lock processing section 415, a parental lock release request R15 including the input parental unlock code and the content ID corresponding to the content on which the release of the parental lock is decided to be performed by the user in Step S123. Upon reception of the parental lock release request R15, the parental lock processing section 415 reads the parental unlock code registered in the parental unlock code field 734 (see, FIG. 17) in the corresponding record from the content management table 730 based on the content ID included in the parental lock release request R15. Then, the parental lock processing section 415 compares the parental unlock code included in the input parental lock release request R15 with the parental unlock code read from the parental unlock code field 734 of the content management table 730 (Step S203).

When it is judged that both the parental unlock codes coincide (Yes in Step S204), the parental lock processing section 415 updates the value of the parental lock flag set in the parental lock flag field 733 in the corresponding record from "with parental lock" to "without parental lock". In addition, the parental lock processing section 415 deletes the parental unlock code corresponded to the parental lock flag (Step S205).

When the setting of the parental lock is released as described above, the parental lock processing section 415 supplies, to the UI processing section 412, a parental lock release completion notification R21 including the content ID of the content that has been subjected to the release of the parental lock. Upon reception of the parental lock release completion notification R21 from the parental lock processing section 415, the UI processing section 412 supplies, to the display section 404, a parental lock release display request R22 including the content ID that has been subjected to the release of the parental lock setting. Upon reception of the parental lock release display request R22 from the UI processing section 412, the display section 404 deletes the graphic symbol 811 indicating that the parental lock is already set on the display list of the program title corresponding to the content that has been subjected to the release of the parental lock setting (Step S206).

On the other hand, in Step S204, if it is judged that the parental unlock codes do not coincide (No in Step S204), the parental lock processing section 415 supplies a code mismatch notification R23 to the UI processing section 412. Upon reception of the code mismatch notification R23 from the parental lock processing section 415, the UI processing section 412 performs an error processing so that the fact that an input error of the parental unlock code occurs is indicated for the user through the display section 404. After that, the UI processing section 412 causes the menu screen 801 to be displayed again on the display section 404, thereby urging the user to perform a subsequent operation (Step S124).

The description will be return to the case where the parental lock setting is released. After the process of Step S206, the parental lock processing section 415 of the remote controller 400 performs the processing as follows. The parental lock processing section 415 transmits, to the client apparatus 500 by using the optical communication section 402, a parental lock release notification R24 including the content ID of the content that has been subjected to the release of the parental lock and the apparatus ID of the server apparatus 600a in which the data of the content is accumulated (Step S207).

The list relay section 543 of the client apparatus 500 receives the parental lock release notification R24 from the remote controller 400 by using the optical communication section 511 (Step S208). The list relay section 543 transmits a parental lock release notification C10 including the content ID included in the parental lock release notification R24 to the server apparatus 600a corresponding to the apparatus ID included in the received parental lock release notification R24 via the home network 200 (Step S209).

Upon reception of the parental lock release notification C10 from the client apparatus 500, the parental lock processing section 633 of the server apparatus 600a performs the processing as follows. Based on the content ID included in the parental lock release notification C10, the parental lock processing section 633 updates the value of the parental lock flag set to the corresponding content in the content list table 720 from "with parental lock" to "without parental lock" (Step S210).

Next, the parental lock processing section 633 transmits an update completion notification S3 including the apparatus ID and the content ID included in the parental lock release notification R24 to the client apparatus 500 via the home network 200 (Step S211).

Upon reception of the update completion notification S3 (Step S212), the list relay section 543 of the client apparatus 500 transmits an update completion notification C16 including the apparatus ID and the content ID included in the update completion notification S3 to the remote controller 400 by using the optical communication section 511 (Step S213).

The parental lock processing section 415 of the remote controller 400 receives the update completion notification C16 from the client apparatus 500 (Step S214).

Even in a case where the parental lock settings for the plurality of server apparatuses 600 are released, by performing the setting release operation of the parental lock as described above, the parental lock settings can be unified and managed by the remote controller 400, with the result that the convenience for the user is improved.

(Reproduction Operation of Content to which Parental Lock is Set)

Figure 26:
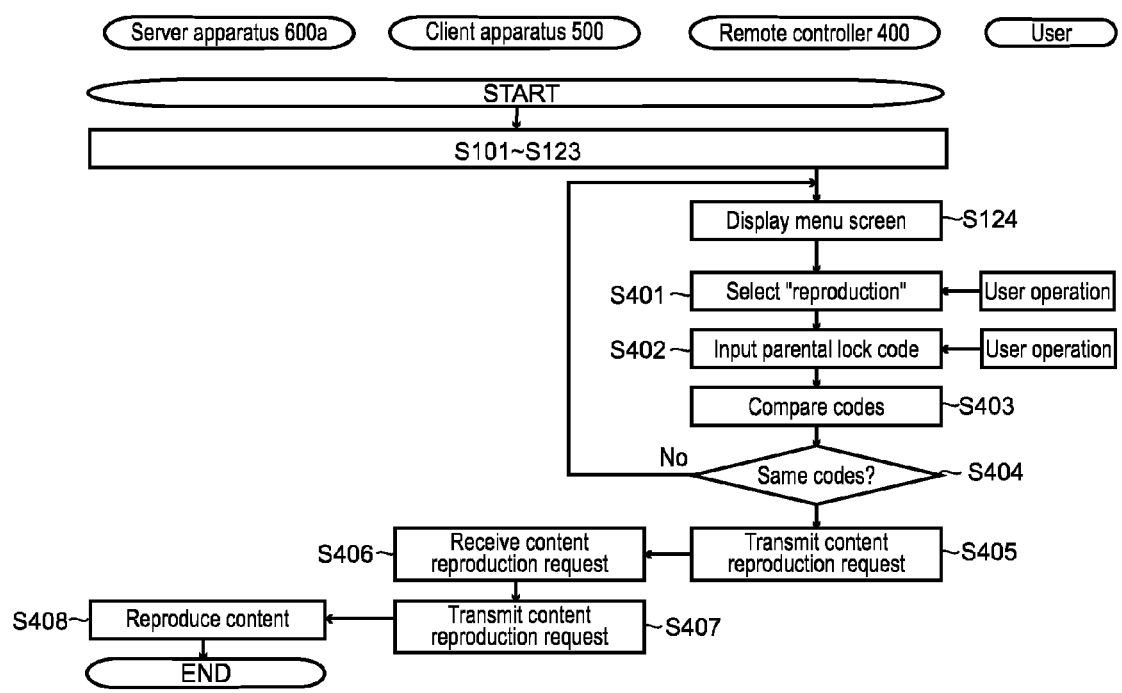
FIG. 26 is a flowchart showing a reproduction operation of a content by the content management system.

Next, a reproduction operation of the content to which the parental lock is set will be described with reference to FIG. 26. FIG. 26 is a flowchart showing the reproduction operation of the content to which the parental lock is set by the content management system 100.

As shown in FIG. 26, the operations of Steps S101 to S124 are performed. Let as assume that in Step S124, the execution of a "reproduction" processing is selected by the user by using the input operation section 405 on the menu screen 801 displayed on the screen of the display section 404 of the remote controller 400. The input operation section 405 supplies the selection information R12 of the "reproduction" processing selected by the user to the UI processing section 412 (Step S401).

Upon reception of the selection information R12 of the "reproduction" processing from the input operation section 405, the UI processing section 412 creates display data of the parental unlock code input screen 802 (shown in FIG. 16) based on the selection information R12 and supplies the display request R13 including the display data to the display section 404. As a result, the parental unlock code input screen 802 is displayed on the screen of the display section 404.

The user references the parental unlock code input screen 802 displayed on the display section 404 and inputs the parental unlock code by using the input operation section 405. The input operation section 405 supplies the parental unlock code R14 input by the user to the UI processing section 412.

Upon reception of the parental unlock code R14 from the input operation section 405, the UI processing section 412 causes the input parental unlock code to be displayed for conformation on the parental unlock code input screen 802 of the display section 404. The user confirms whether the parental unlock code displayed is correct. When the parental unlock code is correct, the user presses a specific key of the input operation section 405 and inputs the fact that the parental unlock code to be input is decided (Step S402).

The input operation section 405 notifies the UI processing section 412 of the decision. In response to this notification, the UI processing section 412 supplies, to the parental lock processing section 415, the parental lock release request R15 including the input parental unlock code and the content ID corresponding to the content that the user decides to reproduce in Step S123. Upon reception of the parental lock release request R15, the parental lock processing section 415 reads the parental unlock code registered in the parental unlock code field 734 (see, FIG. 17) in the corresponding record from the content management table 730 based on the content ID included in the parental lock release request R15. Then, the parental lock processing section 415 compares the parental unlock code included in the input parental lock release request R15 with the parental unlock code that is read from the parental unlock code field 734 of the content management table 730 (Step S403).

When it is judged that both the parental unlock codes coincide (Yes in Step S404), the parental lock processing section 415 performs the following processing. That is, the parental lock processing section 415 transmits, to the client apparatus 500 by using the optical communication section 402, a reproduction request R25 including the apparatus ID and the content ID corresponded to the content selected by the user (Step S405).

The list relay section 543 of the client apparatus 500 receives the reproduction request R25 from the remote controller 400 by using the optical communication section 511 (Step S406). The list relay section 543 transmits a content reproduction request C11 including the content ID included in the reproduction request R25 to the server apparatus 600a corresponding to the apparatus ID included in the received reproduction request R25 via the home network 200 (Step S407).

The reproduction processing section 626 of the server apparatus 600a receives the content reproduction request C11 from the client apparatus 500 via the home network 200. Upon reception of the content reproduction request C11, the reproduction processing section 626 performs a reproduction processing with respect to the content based on the content ID included in the content reproduction request C11 (Step S408).

On the other hand, in Step S404, if it is judged that the parental unlock codes do not coincide (No in Step S404), the parental lock processing section 415 supplies the code mismatch notification R23 to the UI processing section 412. Upon reception of the code mismatch notification R23 from the parental lock processing section 415, the UI processing section 412 performs an error processing so that the fact that the input error of the parental unlock code occurs is indicated for the user through the display section 404. After that, the UI processing section 412 causes the menu screen 801 to be displayed again on the display section 404, thereby urging the user to perform a subsequent operation (Step S124).

(Move Operation of Content to which Parental Lock is Set)

Figure 22:
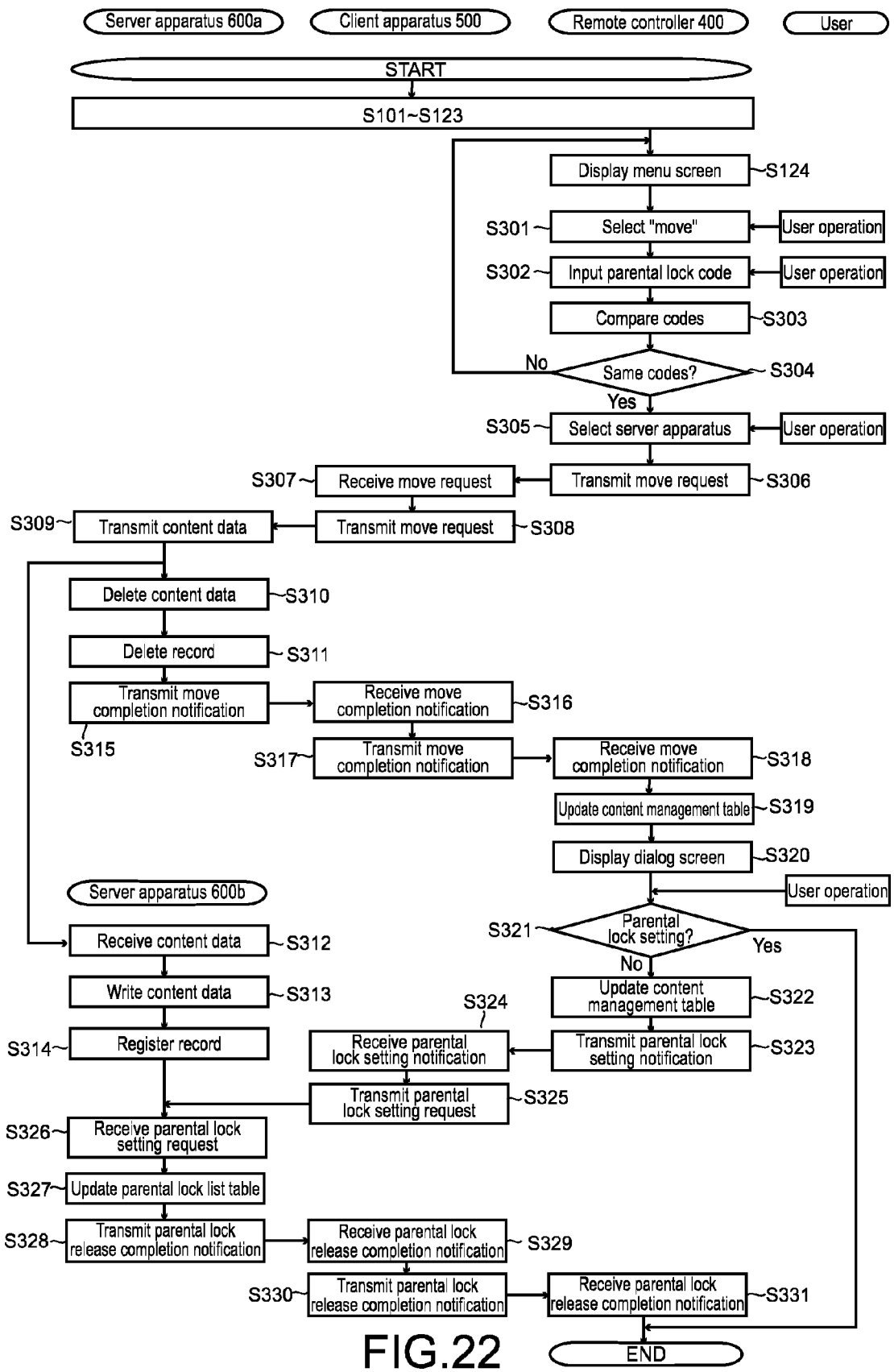
FIG. 22 is a flowchart showing a move operation of a content by the content management system.

Next, a move operation of the content to which the parental lock is set will be described with reference to FIG. 22. FIG. 22 is a flowchart showing the move operation of the content to which the parental lock is set by the content management system 100.

As shown in FIG. 22, the operations of Steps S101 to S124 are performed. In Step S124, the user selects the execution of a "move" processing by using the input operation section 405 on the menu screen 801 displayed on the screen of the display section 404 of the remote controller 400. The input operation section 405 supplies, to the UI processing section 412, the selection information R12 of the "move" processing selected by the user (Step S301).

Upon reception of the selection information R12 of the "move" processing from the input operation section 405, the UI processing section 412 creates the display data of the parental unlock code input screen 802 (shown in FIG. 16) based on the selection information R12 and supplies the display request R13 including the display data to the display section 404. As a result, the parental unlock code input screen 802 (shown in FIG. 16) is displayed on the screen of the display section 404.

The user references the parental unlock code input screen 802 displayed on the display section 404 and inputs the parental unlock code by using the input operation section 405. The input operation section 405 supplies a parental unlock code R20 input by the user to the UI processing section 412.

Upon reception of the parental unlock code R20 input from the input operation section 405, the UI processing section 412 causes the input parental unlock code to be displayed for confirmation on the parental unlock code input screen 802 of the display section 404. The user confirms whether the parental unlock code displayed is correct. When the parental unlock code is correct, the user presses a specific key of the input operation section 405 and inputs the fact that the parental unlock code to be input is decided (Step S302).

The input operation section 405 notifies the UI processing section 412 of the decision. In response to this notification, the UI processing section 412 supplies, to the parental lock processing section 415, a move authorization request R31 including the input parental unlock code and the content ID corresponding to the content that the user has decided to move in Step S123. Upon reception of the move authorization request R31, the parental lock processing section 415 reads the parental unlock code registered in the parental unlock code field 734 (shown in FIG. 17) in the corresponding record from the content management table 730 based on the content ID included in the move authorization request R31. Then, the parental lock processing section 415 compares the parental unlock code included in the move authorization request R31 with the parental unlock code read from the parental unlock code field 734 of the content management table 730 (Step S303).

In Step S304, if it is judged that the parental unlock codes do not coincide (No in Step S304), the parental lock processing section 415 supplies the code mismatch notification R23 to the UI processing section 412. Upon reception of the code mismatch notification R23 from the parental lock processing section 415, the UI processing section 412 performs an error processing so that the fact that an input error of the parental unlock code occurs is indicated for the user through the display section 404. After that, the UI processing section 412 causes the menu screen 801 to be displayed again on the display section 404, thereby urging the user to perform a subsequent operation (Step S124).

When it is judged that both the parental unlock codes coincide (Yes in Step S304), the parental lock processing section 415 performs the operation as follows. The parental lock processing section 415 gives an instruction to the UI processing section 412 to perform a processing so that the user selects one from among the server apparatuses 600 as a move destination.

Upon reception of the instruction from the parental lock processing section 415, the UI processing section 412 reads the server name 702 from the server list table 710, creates display data of the server selection screen 800 (shown in FIG. 11) including the list of the server names 702, and supplies the display request R4 including the display data to the display section 404. The user references the server selection screen 800 and selects the server apparatus 600 as the move destination of the content by using the input operation section 405. Herein, let as assume that the server apparatus 600b is selected (Step S305).

The input operation section 405 supplies, to the UI processing section 412, the move destination notification R28 including the apparatus ID of the server apparatus 600b selected as the move destination by the user. Upon reception of the move destination notification R28, the UI processing section 412 supplies, to the move processing section 416, the apparatus ID of the server apparatus 600b as the move destination, which is included in the move destination notification R28. Further, the UI processing section 412 supplies, to the move processing section 416, the content ID included in the selection information R10 received in Step S123 and the apparatus ID of the server apparatus 600a as a move source, which is included in the server selection request R5 received in Step S112.

Upon reception of those information items from the UI processing section 412, the move processing section 416 transmits the move request R29 including those information items to the client apparatus 500 by using the optical communication section 402 (Step S306).

The list relay section 543 of the client apparatus 500 receives the move request R29 from the remote controller 400 by using the optical communication section 511 (Step S307). Based on the apparatus ID of the server apparatus as the move source included in the move request R29, the list relay section 543 transmits, to the corresponding server apparatus 600a, the move request C12 including the apparatus ID of the server apparatus 600b as the move destination and the content ID included in the move request R29 (Step S308).

The move processing section 634 of the server apparatus 600a as the move source receives the move request C12 from the client apparatus 500 via the home network 200. The move processing section 634 reads data of the content corresponding to the content ID included in the move request C12 from the content data storage section 624. Subsequently, the move processing section 634 transmits the read content data to the corresponding server apparatus 600b via the home network 200 based on the apparatus ID of the server apparatus as the move destination, which is included in the move request C12 (Step S309).

Upon completion of the transmission of the content data, the move processing section 634 deletes the content data from the content data storage section 624 (Step S310). The move processing section 634 supplies a record deletion request to the content list processing section 631 of the apparatus to which the move processing section 634 itself belongs. Upon reception of the record deletion request, the content list processing section 631 deletes the information (record) as to the content moved in Step S310 from the content list table 720 stored in the content list storage section 632 (Step S311).

On the other hand, the server apparatus 600b as the move destination performs the following processing. That is, the move processing section 634 of the server apparatus 600b receives, via the home network 200, data of the content transmitted in Step S310 from the server apparatus 600a as the move source (Step S312). The move processing section 634 writes the data of the content received in the content data storage section 624 thereof (Step S313). Further, the move processing section 634 registers as a new record, in the content list table 720 thereof, the content ID, the program title, and the value of the parental lock flag that are the information on the currently received content (Step S314).

The description will be returned to the operation of the server apparatus 600a as the move source. Upon completion of the move as described above, the content list processing section 631 of the server apparatus 600a as the move source performs the following processing. The content list processing section 631 transmits, to the client apparatus 500 via the home network 200, a move completion notification S4 including the information on the content that have been moved, the apparatus ID thereof as the move source, and the apparatus ID of the apparatus as the move destination (Step S315).

Upon reception of the move completion notification S4 from the server apparatus 600a via the home network 200 (Step S316), the list relay section 543 of the client apparatus 500 transmits a move completion notification C13 to the remote controller 400 by using the optical communication section 511 (Step S317). The move completion notification C13 includes the information on the content, the apparatus ID thereof as the move source, and the apparatus ID of the apparatus as the move destination.

The parental lock processing section 415 of the remote controller 400 receives the move completion notification C13 from the client apparatus 500 (Step S318). Upon reception of the move completion notification C13, the parental lock processing section 415 updates the content management table 730 stored in the content list storage section 414 based on the information included in the move completion notification C13 (Step S319). That is, the parental lock processing section 415 deletes the information (record) as to the already moved content of the server apparatus 600a as the move source from the content management table 730 stored in the content list storage section 414. In addition, the parental lock processing section 415 adds the information (record) as to the already moved content of the server apparatus 600b as the move destination to the content management table 730. FIG. 23 is a diagram showing an example of the update of the content management table 730 because of the move. In this example, described is a case where data of a content whose content ID is "Program 2" stored in a server apparatus whose apparatus ID is "Server 2" is moved to a server apparatus whose apparatus ID is "Server 1". In the case of the move, when the parental unlock code is included in the record of the information on the content as the move source, the parental lock processing section 415 performs the following processing before the information on the content as the move source is deleted. That is, the parental lock processing section 415 moves the parental unlock code to the record of the information on the content as the move destination on the content management table 730.

When the content management table 730 is updated, the parental lock processing section 415 supplies an update completion response R27 of the content management table 730 to the UI processing section 412. Upon reception of the update completion response R27, the UI processing section 412 creates display data of a dialog screen 803 for causing the user to determine whether the parental lock is set with respect to the moved content as shown in FIG. 25, for example. Then, the UI processing section 412 supplies the display request R4 including the display data of the created dialog screen 803 to the display section 404.

Based on the display request R4 supplied from the UI processing section 412, the display section 404 displays the dialog screen 803 on the display screen thereof (Step S320). The user references the dialog screen 803 displayed on the display section 404 and determines whether the parental lock is set or not by using the input operation section 405. Herein, if the user performs the input operation so that the parental lock is set by using the input operation section 405 (Yes in Step S321), the process of the flowchart is terminated with the parental lock being set with respect to the content moved to the server apparatus 600*b*.

On the other hand, if the user performs the input operation so that the parental lock is not set by using the input operation section 405 (No in Step S321), the UI processing section 412 supplies a parental lock release request R30 to the parental lock processing section 415. Upon reception of the parental lock release request R30, the parental lock processing section 415 updates the content management table 730 stored in the content list storage section 414 (Step S322). That is, as shown in FIG. 24, the parental lock processing section 415 updates the value of the parental lock flag corresponding to the already moved content of the server apparatus 600*b* as the move destination, which is added to the content management table 730 in Step S319, from "with parental lock" to "without parental lock", for example. Further, the parental lock processing section 415 deletes the parental lock management code that is associated with the content and registered in the content management table 730.

Upon completion of the update of the content management table 730, the parental lock processing section 415 performs the following processing. That is, the parental lock processing section 415 transmits a parental lock release notification R32 including the content ID of the content and the apparatus ID of the server apparatus 600*b* as the move destination to the client apparatus 500 by using the optical communication section 402 (Step S323).

The list relay section 543 of the client apparatus 500 receives the parental lock release notification R32 including the set of the content ID of the content that is desired to be subjected to the release of the parental lock and the apparatus ID of the server apparatus 600*b* from the remote controller 400 by using the optical communication section 511 (Step S324). Upon reception of the parental lock release notification R32, the list relay section 543 transmits a parental lock release request C14 including the content ID included in the parental lock release notification R32 to the server apparatus 600*b* corresponding to the apparatus ID included in the parental lock release notification R32 (Step S325).

The parental lock processing section 633 of the server apparatus 600*b* receives the parental lock release request C14 from the client apparatus 500 via the home network 200 (Step S326). Upon reception of the parental lock release request C14, the parental lock processing section 633 of the server apparatus 600*b* updates the content list table 720 stored in the content list storage section 632 thereof based on the parental lock release request C14 (Step S327). That is, based on the content ID included in the parental lock release request C14, the parental lock processing section 633 retrieves the corresponding record on the content list table 720 and updates the value of the parental lock flag in the record from "with parental lock" to "without parental lock".

Upon completion of the update of the content list table 720, the parental lock processing section 633 of the server apparatus 600*b* transmits a parental lock release completion notification S5 to the client apparatus 500 via the home network 200 (Step S328).

The list relay section 543 of the client apparatus 500 receives the parental lock release completion notification S5 from the server apparatus 600*b* via the home network 200 (Step S329). Upon reception of the parental lock release completion notification S5, the list relay section 543 transmits a parental lock release completion notification C15 to the remote controller 400 by using the optical communication section 511 (Step S330).

The parental lock processing section 415 of the remote controller 400 receives the parental lock release completion notification C15 from the client apparatus 500 by using the optical communication section 402 (Step S331). In this way, the parental lock is set with respect to the content that has been moved.

With the parental lock setting operation described above, even in a case where the minor wants to move the content with his/her own server apparatus 600, the move operation without the use of the remote controller 400 is not allowed. As a result, the parent or guardian can remotely set the parental lock by using the remote controller 400, which improves the convenience for the user.

The embodiment of the present invention is not limited to the above embodiment and can be variously modified without departing from the gist of the present invention.

What is claimed is:
1. An information processing apparatus comprising:
a central processing unit (CPU); and
an input operation section to receive a desired input from a user selected from a plurality of available inputs,
in which the CPU is configured after start-up (i) to cause a request for a server list having a server identification and a server name for each of a number of servers connected to a network which are usable with the apparatus to be wirelessly transmitted, (ii) to automatically create, in response to receipt of the server list, a selection list having the name, without the server identification, of each of the servers connected to the network which are usable with the apparatus, such that each server in the server list is in the selection list and such that the selection list includes less information pertaining to each said server included therein as compared to that of the server list, and (iii) to cause the selection list to be displayed on a display,
in which one of the available inputs is a server request input which selects a desired server from the selection list displayed on the display, and another one of the available inputs is a content request input which requests a content list indicative of content from the desired server selected by the user by use of the selection list, wherein the apparatus is operable to prevent access to one or more locked contents, the locked contents being selected from the contents on a content-by-content basis in response to respective user inputs to the input operation section based on the content list, wherein selecting the locked contents requires entering a code into the information processing apparatus, and wherein not-locked contents are displayed in a manner that distinguishes them from the locked contents.

2. The information processing apparatus as recited in claim 1, wherein the apparatus is operable to selectively unlock one or more of the locked contents on a content-by-content basis.

3. The information processing apparatus as recited in claim 1, in which the server name of a respective one of the number of servers is indicative of a room in which the respective server is located.

4. The information processing apparatus as recited in claim 1, in which the server name of a respective one of the number of servers is indicative of a type of operating function associated with the respective server.

5. An information processing method comprising:

transmitting wirelessly a request for a server list having a server identification and a server name for each server of a number of servers connected to a network which are usable with the information processing apparatus;

automatically creating, in response to receipt of the server list, a selection list having the name, without the server identification, of each of the servers connected to the network which are usable with the information processing apparatus, such that each server in the server list is in the selection list and such that the selection list includes less information pertaining to each said server included therein as compared to that of the server list;

causing the selection list to be displayed on a display section;

inputting a desired input from a user selected from a plurality of available inputs; and selecting one or more of the contents to be locked contents to which access is prevented, the locked contents being selected from the contents on a content-by-content basis in response to respective user inputs to an input operation section based on the content list, in which one of the available inputs is a server request input which selects a desired server from the selection list displayed on the display section, and another one of the available inputs is a content request input which requests a content list indicative of content from the desired server selected by the user by use of the selection list, wherein selecting the locked contents requires providing a code, and wherein not-locked contents are displayed in a manner that distinguishes them from the locked contents.

6. The information processing method as recited in claim 5, further comprising selectively unlocking one or more of the locked contents on a content-by-content basis.

7. The information processing method as recited in claim 5, in which the server name of a respective one of the number of servers is indicative of a room in which the respective server is located.

8. The information processing method as recited in claim 5, in which the server name of a respective one of the number of servers is indicative of a type of operating function associated with the respective server.

* * * * *